United States Patent
Zhohov et al.

(10) Patent No.: US 12,284,099 B2
(45) Date of Patent: Apr. 22, 2025

(54) METHOD FOR LATENCY ESTIMATION IN WIRELESS NETWORKS

(71) Applicant: INFOVISTA SAS, Massy (FR)

(72) Inventors: Roman Zhohov, Linkoping (SE); Dimitar Minovski, Skelleftea (SE); Per Gustaf Anders Johansson, Skelleftea (SE); Niclas Ögren, Ursviken (SE); Irina Cornelia Cotanis, Warrentown, VA (US)

(73) Assignee: INFOVISTA SAS, Massy (FR)

( * ) Notice: Subject to any disclaimer, the term of this patent is extended or adjusted under 35 U.S.C. 154(b) by 368 days.

(21) Appl. No.: 17/417,706

(22) PCT Filed: Dec. 13, 2019

(86) PCT No.: PCT/EP2019/085204
§ 371 (c)(1),
(2) Date: Jun. 23, 2021

(87) PCT Pub. No.: WO2020/136027
PCT Pub. Date: Jul. 2, 2020

(65) Prior Publication Data
US 2022/0078099 A1    Mar. 10, 2022

(30) Foreign Application Priority Data
Dec. 28, 2018  (EP) ..................... 18306881

(51) Int. Cl.
*H04L 43/0852*    (2022.01)
*H04L 41/14*      (2022.01)
(Continued)

(52) U.S. Cl.
CPC .......... *H04L 43/0852* (2013.01); *H04L 41/14* (2013.01); *H04L 41/16* (2013.01);
(Continued)

(58) Field of Classification Search
CPC ..... H04L 43/0852; H04L 41/14; H04L 41/16; H04L 43/106; H04L 41/142; H04W 24/02; H04W 24/08; H04W 36/0085
See application file for complete search history.

(56) References Cited

U.S. PATENT DOCUMENTS

| 2007/0217343 A1* | 9/2007 | Znamova ............... H04L 41/147 370/252 |
| 2012/0131129 A1* | 5/2012 | Agarwal ................. H04L 43/04 709/216 |

(Continued)

OTHER PUBLICATIONS

Zhu et al., "On the Accuracy of Packet Delay Estimation in Distributed Service Networks," Journal of Network and Systems Management, vol. 21, (4), pp. 623-649, Dec. 2013 (Year: 2013).*

(Continued)

*Primary Examiner* — Un C Cho
*Assistant Examiner* — Lalita W Pace
(74) *Attorney, Agent, or Firm* — Greer, Burns & Crain, Ltd

(57) ABSTRACT

A method for estimating up-link latency, and/or down-link latency, and/or round-trip latency in a packet based wireless network for communication between two network nodes, wherein the method includes:
  a. measuring one or more metrics and/or using information from network procedures to estimate metrics, wherein the metrics have at least one or more of radio metrics available to a UE (User Equipment) or to a BS (Base Station) or similar access-point,
  b. measuring the metrics defined in a) either in a dedicated mode using packet sequence, and/or in a dedicated mode using available traffic, and/or in an idle mode,
  c. measuring the metrics defined in a) both on a serving and a non-serving cells, and/or beams,
  d. estimating up-link latency, and/or down-link latency, and/or round-trip latency by using multivariable, non- (Continued)

linear or linear function prediction, machine learning based prediction or mathematical or logical predictions based on the metrics defined in a).

8 Claims, 11 Drawing Sheets

(51) Int. Cl.
  *H04L 41/16* (2022.01)
  *H04W 24/02* (2009.01)
  *H04W 24/08* (2009.01)
  *H04W 36/00* (2009.01)

(52) U.S. Cl.
  CPC .......... *H04W 24/02* (2013.01); *H04W 24/08* (2013.01); *H04W 36/0085* (2018.08)

(56) References Cited

U.S. PATENT DOCUMENTS

| | | |
|---|---|---|
| 2015/0263921 A1 | 9/2015 | Lee et al. |
| 2018/0175926 A1 | 6/2018 | Rudrapatna |
| 2020/0195539 A1* | 6/2020 | Sivaraj .................. G06N 20/20 |
| 2021/0266247 A1* | 8/2021 | Sivaraj ............... H04L 43/0876 |

OTHER PUBLICATIONS

European Search Report and Written Opinion received for Application No. 18306881.6, dated May 28, 2019.
International Search Report and Written Opinion received for PCT/EP2019/085204, mailed Feb. 17, 2020.
Corcoran, P., "A Matter of Timing: Consumer Electronics and Network Time," IEEE Consumer Electronics Magazine, vol. 2, No. 4, 2013, pp. 20-25.
Eidson, J., et al., "IEEE Standard for a Precision Clock Synchronization Protocol for Networked Measurement and Control Systems and Applications to the Power Industry," IEEE Std 1588-2008, (Revision of IEEE Std 1588-2002), 2008, 13 pages.
Endace Technology Limited, "IEEE 1588 PTP clock synchronization over a WAN backbone," 2016, 14 pages.
Goodfellow, I., et al. "Deep learning," vol. 1, Chapter 12: Applications (George Dahl, et al.), Cambridge: MIT press, 2016, pp. 443-485.
Huawei, et al., "Radio measurements for feMDT," Discussion and Decision, Agenda Item 7.8, SI: Further MDT enhancements, Fukuoka, Japan, May 2015, 2 pages.
Infovista Sas, "A Machine Learning Approach in SG12," Study Group 12: Discussion on Machine Learning, Telecommunication Standardization Sector, Geneva, Switzerland, Nov.-Dec. 2018, 4 pages.
Kopetz, H., "Real-time systems: design principles for distributed embedded applications," Chapter 7: Real-Time Communications, Springer Science & Business Media, 2011, pp. 145-171.
Kyocera, "Potential solutions for UL latency measurements," Discussion and Decision, Agenda Item 7.8, Fukuoka, Japan, May 2015, 2 pages.
Mills, D., et al., "Network Time Protocol Version 4: Protocol and Algorithms Specification," Network, 2010, 110 pages.
Sutton, C., "Classification and Regression Trees, Bagging, and Boosting," Handbook of Statistics, vol. 24, 2005, pp. 303-329.
Wang, M., et al., "Machine Learning for Networking: Workflow, Advances and Opportunities," IEEE Network, vol. 32, No. 2, 2018, pp. 92-99.
Yuan, Z., et al., "A Machine Learning Based Approach to Mobile Network Analysis," 27th IEEE International Conference on Computer Communication and Networks, Jul. 2018, 9 pages.
3GPP, TS 36.213, "3rd Generation Partnership Project; Technical Specification Group Radio Access Network; Evolved Universal Terrestrial Radio Access (E-UTRA); Physical layer procedures," Technical Specification, Release 8, Version 8.2.0, 2008. 30 pages.
3GPP, TS 36.211, "3rd Generation Partnership Project; Technical Specification Group Radio Access Network; Evolved Universal Terrestrial Radio Access (E-UTRA); Physical channels and modulation," Technical Specification, Version 13.2.0, Release 13, 2016, 168 pages.
3GPP, TS 36.321, "LTE; Evolved Universal Terrestrial Radio Access(E-UTRA); Medium Access Control (MAC) protocol specification," Technical Specification, Version 10.1.0, Release 10, 2011, 55 pages.
3GPP, TS 36.322, "Evolved Universal Terrestrial Radio Access (E-UTRA); Radio Link Control (RLC) protocol specification," version 10.0.0, Release 10, 2011, 42 pages.
3GPP, TS 28.627, "3rd Generation Partnership Project; Technical Specification Group Services and System Aspects; Telecommunication Management; Self-Organizing Networks (SON) Policy Network Resource Model (NRM) Integration Reference Point (IRP); Requirements," Technical Specification; version 13.2.0, Release 13, 2016, 34 pages.
3GPP, TS 38.201, "5G; NR; Physical layer; General description," Technical Specification; version 15.0.0, Release 15, 2018, 14 pages.

\* cited by examiner

MO1

MO2

METHOD FOR LATENCY ESTIMATION IN WIRELESS NETWORKS

BACKGROUND

The subject matter of the present application concerns latency estimations in wireless networks.

There is an exponential growth in applications where the latency is the most important metric for evaluating quality of experience. Everything from remote controlled machines and remote surgery to cloud gaming rely on low latency. Many of these applications will be accessed through wireless networks. The soon to come 5G wireless networks even promises an intrinsic low latency. This means the Operators of the wireless network need to know if their network delivers the promised latency. It is laborious and not cost effective to measure one-way latency, induced by the network, since the source and destination nodes must be time synchronized. Also, the latency metric is typically calculated through Round-trip Time (RTT) measurements, which are not in real-time and require sending a packet sequence.

Network latency is a measurement of the time it takes for a data packet to travel from one point to another in a network. Measuring network latency can be divided into two types of measurements: round trip time, and one way latency.

Traditionally, round trip time is measured by sending a packet sequence from a source to destination node in the network, echoing the packet sequence at that point back to the source. Once the source node receives the echo from the destination, it may subtract the receive time from the original send time. The difference among the times represents the RTT latency value. The disadvantage with this method is it can only give the sum of the path to a destination node and the path back to the source node. The advantage of this method is that it is relative, meaning that the source node and the destination node do not need to be time synchronized, or to have same absolute time. An example of a simple round trip measurement is by sending a Ping messages.

Traditionally, one way latency is measured by sending a packet sequence, or packet train from one node to another in the network. At the destination node the receiving time is subtracted from the sending time, and the difference represents the one way latency. This means that time at sending and receiving points must be either synchronized or absolute. There is a requirement on the time measurement to have insignificant drift between the moments it is being synchronized. Synchronization of the time or absolute time may be accomplished with, for example, Network Time Protocol (NTP), and Precision Time Protocol (PTP). Time synchronization may also be accomplished with GPS, or similar systems.

SUMMARY

An object of the present invention is to cost effectively determine the latency in a wireless network.

It is a further object of the invention to present a real time method for determining the latency.

At least one of the above-mentioned objects is achieved with a method according to the present invention for estimating up-link latency, and/or down-link latency, and/or round-trip latency in a packet based wireless network for communication between two network nodes, wherein the method comprising:
  a. measuring one or more metrics and/or using information from network procedures to estimate metrics, wherein the metrics comprise at least one or more of the following and/or any ratios or combinations of:
     i. up-link throughput,
     ii. down-link throughput,
     iii. down-link block error rate,
     iv. up-link block error rate,
     v. total received power at a User Equipment,
     vi. pilot signals power,
     vii. reference signals power,
     viii. interference power,
     ix. noise power,
     X. signal to noise ratio,
     xi. signal to interference-plus-noise ratio,
     xii. transmit power,
     xiii. used modulation scheme,
     xiv. up-link handover,
     XV. down-link handover,
     xvi. number of re-transmissions,
     xvii. cell re-selection,
     xviii. cell configuration,
     xix. carrier aggregation,
     XX. spatial and/or temporal multiplexing,
     xxi. multiple-input multiple-output,
     xxii. multi-user massive multiple-input multiple-output,
     xxiii. beam acquisition,
     xxiv. beam switching,
     XXV. phase tracking,
  b. measuring the metrics defined in a) either in a dedicated mode using packet sequence, and/or in a dedicated mode using available traffic, and/or in an idle mode,
  c. measuring the metrics defined in a) both on a serving and a non-serving cells, and/or beams,
  d. estimating up-link latency, and/or down-link latency, and/or round-trip latency by using multivariable, non-linear or linear function prediction, machine learning based prediction or mathematical or logical predictions based on the metrics defined in a).

With the method according to the invention, the latency can be estimated in real time. Estimating the latency introduced by the radio network is a much more cost effective and real-time usable solution than actually measuring it. The novelty of the present invention comprises:
  1) Unlike other methods which measure the latency, the present invention estimates the latency. There are several benefits of using an estimator based on the method according to the invention instead of an actual measurement:
     a. The estimation may be performed without an actual destination node, referred as non-intrusive estimation. This means that the source node is not sending any packet sequence, and therefore no server is needed at the destination point.
     b. The estimation, when deployed, does not need any time synchronization.
     c. The estimation may be performed in real-time, which enable the possibility to change the behavior of a User Equipment (UE) and/or, for example adapting the transmission characteristics at the UE and a BS, resource sharing at the BS, and/or adapting the queues at the UE.
  2) Unlike any prior art, the estimation may be performed by using multivariable, non-linear or linear function prediction, machine learning based prediction or mathematical or logical predictions.
  3) Unlike any prior art, the invention presents a framework for creating learning and verification data-set, which may be used by multivariable, non-linear or linear function prediction, machine learning based prediction or mathematical or logical predictions.

4) Unlike any prior art, the invention presents a method for adaptive time synchronization on a wireless network, which may be used when other synchronization methods such as GPS are not available.

5) Unlike any prior art, the estimator may be programmed and/or configured to run both in non-intrusive mode, where no packet sequences are sent, and in intrusive mode, where packet sequences are being sent in order to retrieve application layer metrics for improving the estimator.

In this specification, the terms "estimation" and "prediction" are interchangeably used.

According to the invention, the metrics and/or any ratios/combinations of the metrics may be filtered and/or aggregated during a measurement window to create new higher level metrics resulting in improved latency estimation accuracy, the measurement window comprising either one or several combinations of:
 a. measurements from prior time,
 b. measurements during the transmission interval,
 c. measurements within a spatial area.

In particular, the method according to the invention may use measurements from several nodes of the network to create the new higher level metrics in both time and spatial domains.

According to the invention, the wireless network may be an UMTS network, wherein the metrics comprise at least one or more of the following and/or any ratios or combinations of:
 i. Cell re-selection,
 ii. Cell configuration,
 iii. Physical throughput,
 iv. Handover,
 v. DCA,
 vi. Timeslot ISCP,
 vii. P-CCPCH RSCP,
 viii. RSCP from one or more detectable cells,
 ix. CPICH Ec/No from one or more detectable cells,
 x. E-UTRA RSRP from one or more detectable cells,
 xi. E-UTRA RSRQ from one or more detectable cells,
 xii. E-UTRA SINR,
 xiii. UTRA carrier RSSI from one or more detectable cells,
 xiv. GSM carrier RSSI from one or more detectable cells,
 XV. SIR,
 xvi. Transport channel BLER,
 xvii. UE transmitted power,
 xviii. SFN-SFN observed time difference,
 xix. UE GPS.

1. According to a variant of the invention, the wireless network may be an LTE network, wherein the metrics comprise at least one or more of the following and/or any ratios or combinations of:
 i. RSSI,
 ii. Received Power from one or more detectable cells and/or beams for the following:
  1. CSI-RS
  2. MBSFN-RS
  3. CRS
  4. UERS
  5. PRS
  6. DMRS,
  7. SSS,
  8. SRS,
 iii. Received Quality from one or more detectable cells and/or beams for the following:
  1. CSI-RS,
  2. MBSFN-RS,
  3. CRS
  4. UERS
  5. PRS
  6. DMRS,
  7. SSS,
  8. SRS,
 iv. CINR
  1. CSI-RS,
  2. MBSFN-RS,
  3. CRS,
  4. UERS
  5. PRS,
  6. DMRS,
  7. SSS,
  8. SRS,
 V. SINR
  1. CSI-RS,
  2. MBSFN-RS,
  3. CRS,
  4. UERS,
  5. PRS,
  6. DMRS,
  7. SSS,
  8. SRS,
 vi. UL Throughput,
 vii. PDSCH Phy Throughput,
 viii. PUSCH Phy Throughput,
 ix. PUSCH MCS,
 X. Transmit Power per bandwidth and/or per reference signal/channel,
 xi. CQI Code,
 xii. Cell re-selection,
 xiii. Handover Information,
 xiv. Intra-frequency Handover,
 xv. Re-transmissions,
 xvi. BLER,
 xvii. Carrier Aggregation,
 xviii. Cell configuration.

2. According to a variant of the invention, the wireless network may be an 5G/NR network, wherein the metrics comprise at least one or more of:
 i. RSSI from one or more detectable cells and/or beams,
 ii. RSRP from one or more detectable cells and/or beams for the following:
  1. SSS,
  2. CSI-RS,
  3. SRS,
  4. DMRS,
  5. PTRS,
  6. BRS,
 iii. RSRQ from one or more detectable cells and/or beams for the following:
  1. SSS,
  2. CSI-RS,
  3. SRS,
  4. DMRS,
  5. PTRS,
  6. BRS,
 iv. SINR/Channel quality for the following:
  1. SSS,
  2. CSI,
  3. SRS,
  4. DMRS, 5. PTRS,
6. BRS,
v. Transmit Power per bandwidth and/or per reference signal/channel,
vi. UE GNSS,
vii. RSTD,
viii. SFTD,
ix. SFN,
X. WLAN RSSI,
xi. BeamIdx,
xii. CSI-IM,
xiii. Beam acquisition,
xiv. HO Info,
xv. Intra-frequency Handover,
xvi. BLER,
xvii. Physical and application layer throughput,
xviii. Carrier Aggregation,
xix. Transmission Point Configuration information,
xx. Cell/beam configuration,
xxi. Modulation schema,
xxii. Frequency spacing,
xxiii. CQI,
xxiv. Re-transmissions,
xxv. RI,
xxvi. PMI,
xxvii. TM,
xxviii. BWP information.

According to the invention, the metrics may be measured and/or derived from one or more of:
a. Physical layer,
b. MAC/DL layer,
c. RLC/RRC/RR layer,
d. PDCP layer,
e. NAS layer,
f. Transport layer,
g. Application layer.

According to an advantageous embodiment of the invention, an estimating latency model may be created and deployed in the network node, the estimating latency model being used for adapting network time synchronization algorithms by:
a. Automatically performing the time-synchronization when the estimated latency is below a setpoint, or
b. Automatically performing the time-synchronization when the values of the measured radio metrics are meeting setpoint requirements.

According to the invention, an estimating latency model may be created and deployed in the network node, the estimating latency model being used for configuring, and/or modifying, and/or adapting network node functionalities, wherein the functionalities comprise one of:
a. transmission scheduling,
b. queue management,
c. Quality of Service negotiation.

With the method according to the invention, the latency is estimated by using for example radio metrics available to a UE (User Equipment) or to a BS (Base Station) or similar access-point. It is an advantageous embodiment to use metrics like physical or application throughput, which are available in dedicated mode.

An estimator based on the method according to the present invention may be both intrusive and non-intrusive.

In an intrusive case, when creating the model for the estimator, an intrusive packet train is sent, from which the latency values are measured at an end point. During run time of the estimator, in the intrusive case, a packet sequence may be sent through the wireless network. This packet sequence is used to generate traffic in order to get physical layer metrics and application metrics during dedicated mode, which may improve the estimator.

In a non-intrusive case, physical layer metrics may be used for estimating the latency, which are available during idle mode.

It is another object of the invention to propose a system comprising:
one or more processors;
one or more non-transitory storage media storing instructions which, when executed by the one or more processors, cause in a packet based wireless network for communication between two network nodes:
a. measuring one or more metrics and/or using information from network procedures to estimate metrics, wherein the metrics comprise at least one or more of the following and/or any ratios or combinations of:
i. up-link throughput,
ii. down-link throughput,
iii. down-link block error rate,
iv. up-link block error rate,
v. total received power at a User Equipment,
vi. pilot signals power,
vii. reference signals power,
viii. interference power,
ix. noise power,
x. signal to noise ratio,
xi. signal to interference-plus-noise ratio,
xii. transmit power,
xiii. used modulation scheme,
xiv. up-link handover,
xv. down-link handover,
xvi. number of re-transmissions,
xvii. cell re-selection,
xviii. cell configuration,
xix. carrier aggregation,
xx. spatial and/or temporal multiplexing,
xxi. multiple-input multiple-output,
xxii. multi-user massive multiple-input multiple-output,
xxiii. beam acquisition,
xxiv. beam switching,
xxv. phase tracking,
b. measuring the metrics defined in a) either in a dedicated mode using packet sequence, and/or in a dedicated mode using available traffic, and/or in an idle mode,
c. measuring the metrics defined in a) both on a serving and a non-serving cells, and/or beams,
d. estimating up-link latency, and/or down-link latency, and/or round-trip latency by using multivariable, non-linear or linear function prediction, machine learning based prediction or mathematical or logical predictions based on the metrics defined in a).

According to an advantageous embodiment of the invention, the network node may be either deployed physically or virtually, and may consist of a User Equipment, and/or a Base Station, and/or any node with wireless network interface.

BRIEF DESCRIPTION OF THE DRAWINGS

The subject matter of the present application can be described with reference to the following figures.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

The one way latency estimation (later referred as only latency estimation) is based on measured radio and application metrics at a User Equipment (UE) and/or Base Station (BS). The estimation model may consist of multivariate non-linear functions, linear functions, or a machine learning estimator. The first step in developing an estimation model is gathering learning data in a controlled test setup, covering as many scenarios as possible. The measurements that may be used as an input to the estimation model may also be additionally aggregated over time and/or space to convey information from earlier times, the time during the transmission and/or other spatial places (e.g. other UEs, or BSs). The accuracy of the estimation model must be evaluated using statistical measures. Finally the model will be deployed on a computing device, performing the latency estimations either in real time, or non-real time.

Concept of Latency

Figure 1:
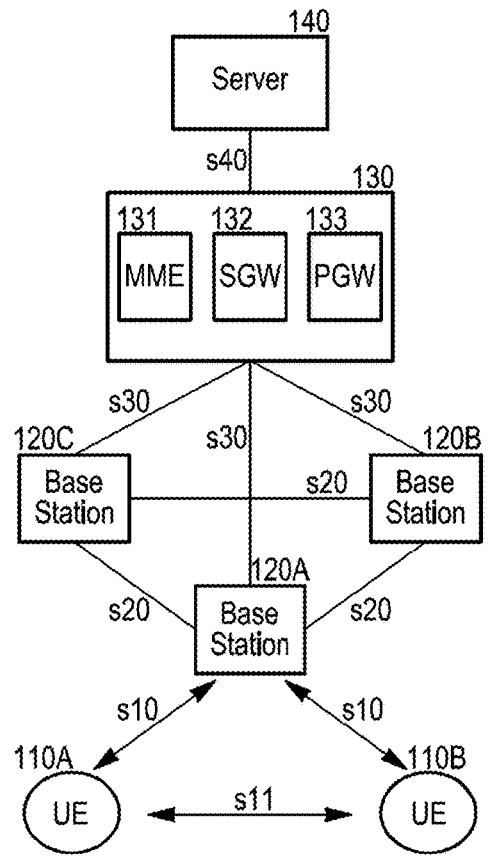
FIG. 1 is an example of a wireless communication system, where a User Equipment is communicating with a network node, a Server in this case.

FIG. 1 shows an example of a wireless communication system to which the present patent is applied. It is noted that the shown wireless communication system is only one possible system, and additional embodiments may be added between any of the illustrated entities, as desired. The illustrated wireless communication system may compose User Equipment (UE) 110, Base Station (BS) 120, Evolved Packet Core (EPC) 130, and Server 140. The UE 110A may be mobile or fixed, integrating a radio equipment for communicating with the network through the S10 wireless link, such as BS 120 or directly to another UE 111B. The BSs may belong to same or different cellular service provider, and are interconnected with S20 network interface, such as Ethernet link. The BSs are connected also to the EPC 130 through S30 network interface. The EPC 130 contains a Mobility Management Entity (MME) 131, which acts as the main control node in the cellular access network, allowing authentication and authorization of the UEs in the network. The EPC 130 also contains SGW 132 and PGW 133, which enable the data transmission between the UEs 110 and the Server 140. It is noted that the UEs and Server 140 may be any device with computing capabilities and network interface. In the illustrated example on the FIG. 1, the Server 140 has an open network interface and listens for upcoming packet sequences from the UE 110 through the S40 communication link.

Figure 2:
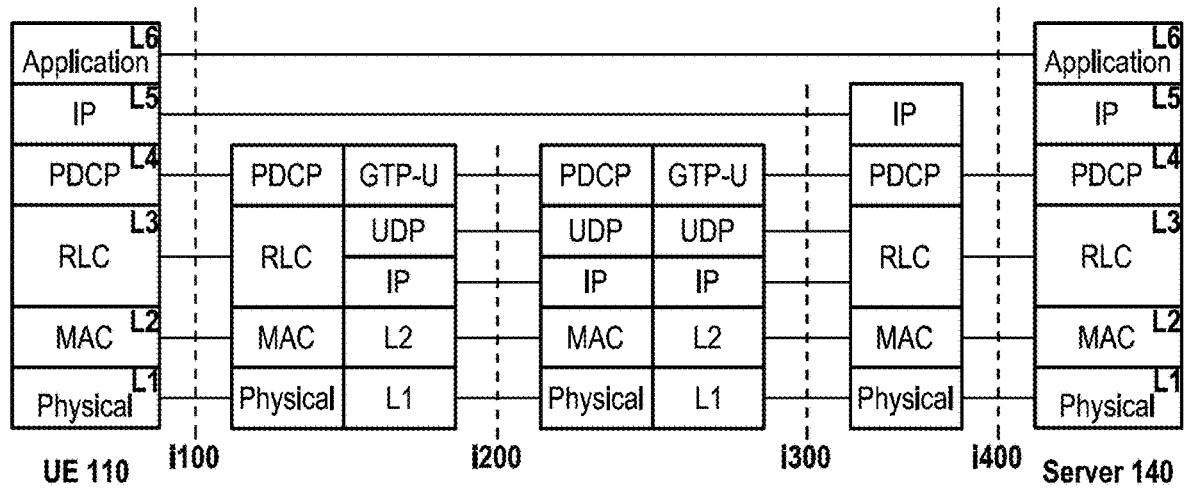
FIG. 2 is an example of the LTE protocol stack, showing the data plane, when a User Equipment is communicating with a network node, a Server in this case.

FIG. 2 shows a user-plane block diagram of a LTE system, where the UE 110 may send packet sequences to the Server 140. As an example, multiple applications may be running in a UE 110 at any time, such as FTP or web-browsing. Hence, the UE 110 creates the user traffic packet sequence at the Application layer L6. The Application layer L6 only specifies the application interface and depends on the underlying layers to establish host-to-host data transfer channels and manage the data exchange in a client-server or peer-to-peer networking model. The host-to-host data transfer channels are established and added as headers to the initial data packet at IP layer L5. For example, the IP address of the destination Server 140 is added as a header at the IP Layer L5. The packets received by a layer are called Service Data Unit (SDU), while the packet output of a layer is referred to by Protocol Data Unit (PDU). The IP Layer L5 submits its SDUs (IP Packets) to the PDCP layer L4. The PDCP layer L4 does header compression and adds its header to the received SDUs. The RLC layer L3 performs segmentation/concatenation of RLC SDU during construction of the RLC PDU. If an RLC SDU is large, or the available radio data rate is low, resulting in small transport blocks, the RLC SDU may be split among several RLC PDUs. The RLC PDU also performs re-ordering and retransmission of packets, referred as RLC re-transmission. The MAC layer L2 is connected to the RLC layer L3 with logical channels, and to the Physical layer L1 with transport channels. Hence, the MAC protocol supports multiplexing of MAC SDUs from one or different logical channels onto transport block (TB) to be delivered to the Physical layer L1 with transport channels. On the other end at the destination node, the MAC protocol performs de-multiplexing from one or different logical channels from TB delivered by the physical layer with transport channels. The MAC layer L2 also controls the re-transmissions at the Physical layer L1, referred as HARQ re-transmissions. The Physical layer L1 carries all information from the MAC transport channels over the air interface. The Physical layer L1 takes care of the link adaptation (AMC), power control, cell search (for initial synchronization and handover purposes) and other measurements (inside the LTE system and between systems) for the RRC layer.

The i100 is an interface for the control and user planes between a UE and BS. The user plane connection is the logical channels represented by Data Radio Bearers (DRBs) which carry user plane traffic. The i200 and i300 interfaces may utilize a GTP protocol in the communication to forward packets, namely GTP-U protocol for the user plane data, and GTP-C for the control plane packet. The i200 interface is intended for the user plane between the BS and SGW, providing a GTP tunnel per bearer. The i300 interface defines a communication between SGW and PGW for both the control and data plane. The i300 interface provides a GTP tunnel per bearer for the user plane, and GTP tunnel management per user for the control plane. The i400 interface serves for the control and user planes between a PGW and the destination Server 140. The IETF-based IP packet forwarding protocols are used in the user plane, while DHCP and RADIUS/Diameter protocols are used in the control plane.

Figure 3:
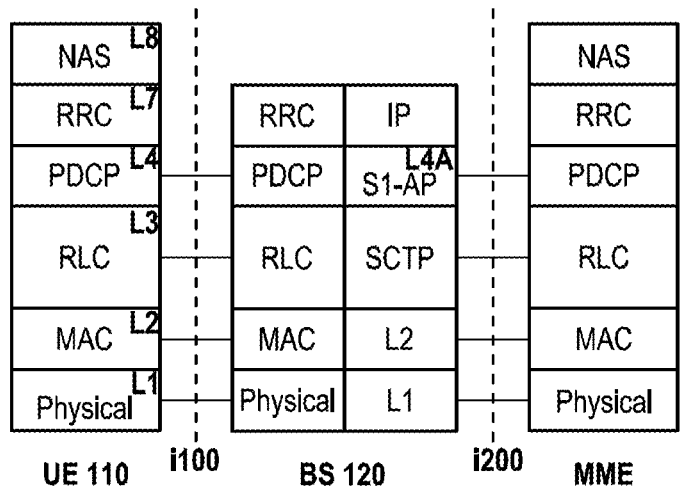
FIG. 3 is an example of the LTE protocol stack, showing the control plane, when a User Equipment is communicating with a network node, a Base Station in this case.

FIG. 3 shows a control-plane block diagram of a LTE system where UE 110 is communication with the Base Station 120. There are number of differences compared to the FIG. 2. Namely, the signaling connection over the i110 is the RRC connections represented by Signaling Radio Bearers (SRBs). It includes the NAS L8 protocol, which performs mobility management and bearer management functions. The RRC L7 protocol supports the transfer of the NAS signaling. It also performs functions required for efficient management of the radio resources. The main functions may include setup, re-configuration, re-establishment, and release of a RRC connection. The RRC L7 protocol also may support setup, modification and release of radio bearers, but also may broadcast system information. The RRC connection might be in either RRC_Idle or RRC_Connected mode. In RRC_Idle state the UE 110 is inactive on the radio channels, but however it has IP address assigned and is being tracked by the network. Hence, major procedures are defined in RRC_Idle mode, such as PLMN Selection, cell selection and Re-selection, cell reservation and access restriction, broadcast message reception, and paging. The RRC_Idle state details are described in 3GPP TS 36.304. In RRC_Connected, the radio channel is active and the UE 110 may communicate with the Base Station 120 and send control plane, and/or data plane packets. The RRC_Connected state details are described in 3GPP TS 36.331.

The i120 interface may include the S1AP protocol L4A which performs functions such as interface management, E-RAB management, NAS signaling transport and UE context management. The i120 interface may deliver the initial UE 110 context to the BS 120 to setup E-RAB(s) and manages modification or release of the UE 110 context thereafter.

Figure 4:
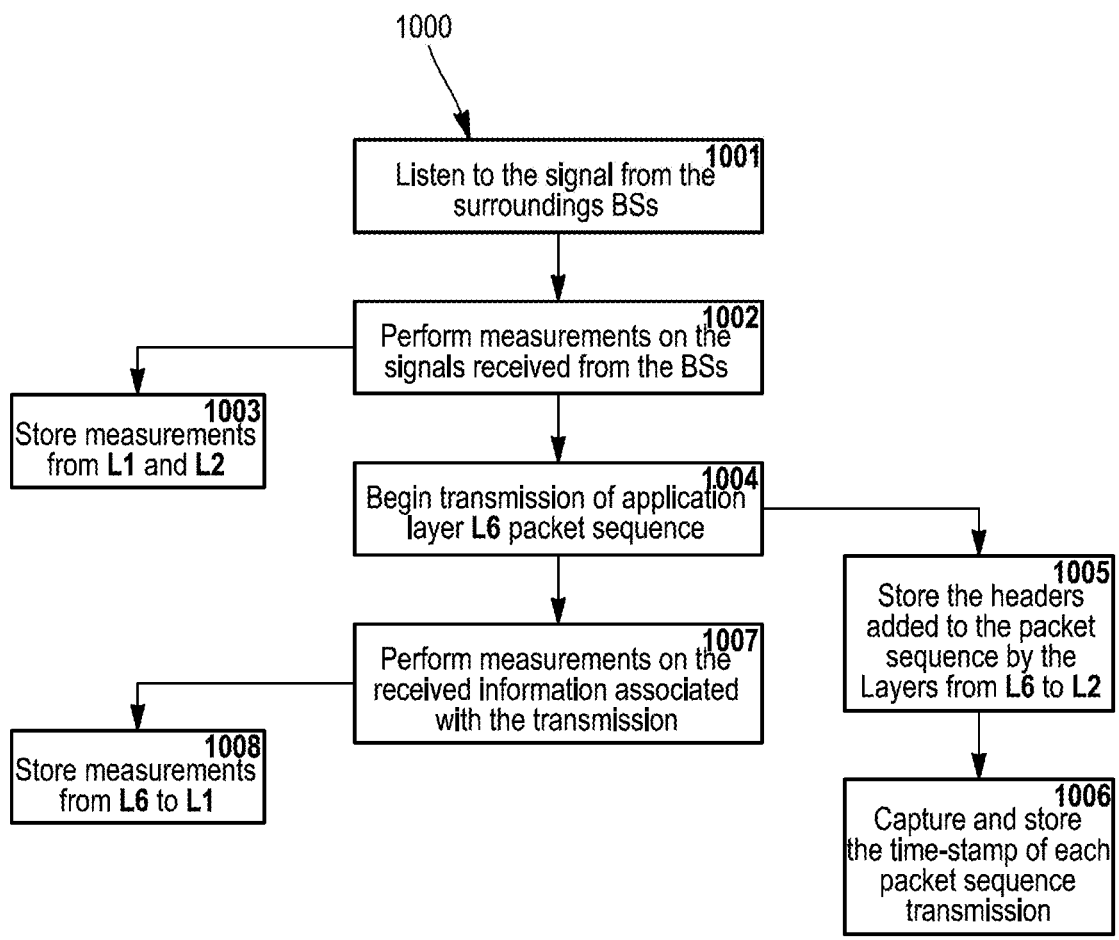
FIG. 4 is a flow chart representing the processes that a software program may go through in measuring metrics necessary for the present invention.

FIG. 4 represents a flow chart of the processes that UE 110 (1000) may go through in measuring metrics from Application layer L6 to the Physical layer L1. As illustrated on the FIG. 3, an UE 110 may initially search for a cell and listen to the signal from the surrounding cells (1001). Thus, the UE 110 in this case may perform measurements on the received signal from the cells (1002). The UE 110 may be specially programmed or otherwise configured to capture and/or measure Physical layer L1 and MAC layer L2 (1003). Measurable metrics at the Physical layer L1 and MAC layer L2 may be in different form in each of the 3GPP cellular network generations. However, the Layer L1 and L2 metrics may describe radio environment and RAN (Radio Access Network) configurations in a form of total received power, pilot/reference signal power, cell re-selection, interference power, residual interference power, and noise power. It is noted that an UE 110 may measure and store the Physical layer L1 and MAC layer L2 metrics while being in idle mode and/or connected mode.

The UE 110 may initiate a RRC connection establishment with the cell and begin transmitting user traffic packet sequence generated at the Application layer L6 (1004). The UE 110 may be specially programmed or otherwise configured to capture and store the headers added by the protocol stack layers from L6 to L1 to the initial user traffic packet sequence (1005). The UE 110 may also capture and store the time-stamps of the packet sequence when they are transmitted over the air at the Physical layer L1 (1006). During the transmission of the packet sequence in RRC_Connected mode, the UE 110 may measure and/or capture information associated with the transmission itself, received from the destination Server 140, as well as from any node along the network path (1007 and 1008). The metrics that the UE 110 may measure and/or capture during end-to-end data transmission (1007 and 1008) may be in a form of Served percentage, UL and/or DL throughput, UL and/or DL BLER, UL and/or DL buffer status, RLC layer packet segmentation, RLC re-transmissions, Packet RTT, handover, detected packet losses, and jitter.

Figure 5:
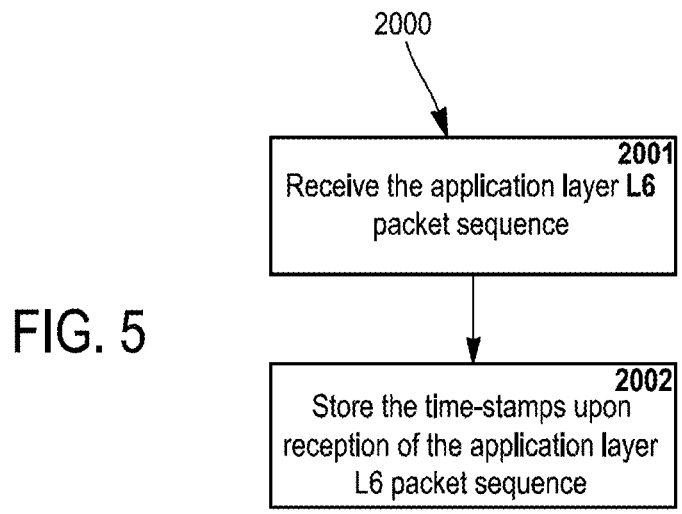
FIG. 5 is a flow chart representing the process that a network node, a Server in this case, may go through upon a reception of data sequence on the network interface.

FIG. 5 shows a flow chart where a Server 140 (2000) may receive data packets from the source node, in this case the UE 110 (2001). It is noted that the Server 140 may capture and store the time-stamps of each data packet arriving at the network interface (2002).

Figure 6:
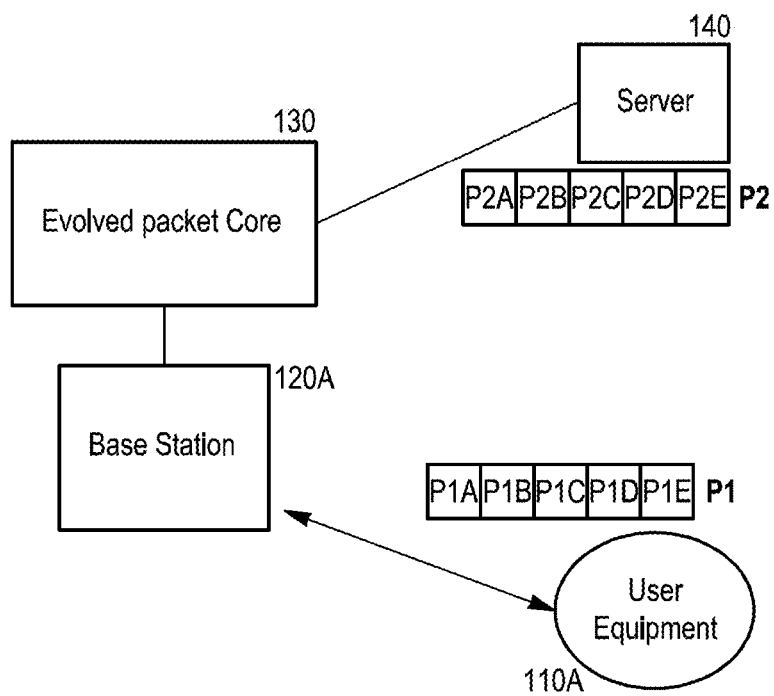
FIG. 6 is an example of a wireless communication system during a data transmission in up-link.

FIG. 6 shows a simplified example of a wireless communication system during a data transmission in up-link, from the UE 110A to the Server 140. As discussed with the FIG. 2, the UE 110A forms the structure of the packet sequence P1 that needs to be transmitted. It is noted that layers from L6 to L1 at the UE 110A supplement the packet sequence P1 with various headers. Moreover, the Application layer L6 may combine several application sources running on the UE 110A into the packet sequence P1. Therefore, the packet sequence P1 may contain packet units P1A, P1B, P1C, P1D, and P1E, each representing different application source. Once a connection is established among the UE 110A and Server 140, the transmission of the packet sequence P1 may begin. The MAC layer L2 queues up the packet units P1A, P1B, P1C, P1D, and P1E, while the Physical layer L1 schedules the transmission. The Physical layer L1 carries the packet sequence over the air, utilizing the S10 wireless network link. It is noted that the packet sequence P1 may be send through one or more carriers, and on one or more antennas at the UE 110A, depending on the wireless technology, e.g. 3G (CA), LTE and 5G (CA, MU/mMIMO).

The BS 120A receives the wireless signal from the UE 110, which carries the packet sequence P1. It is noted that the BS 120A may not receive the packet units P1A, P1B, P1C, P1D, and P1E in chronological order. The BS 110A examines the control plane of the arrived packet sequence P1. The BS 120A check for the destination IP-address at the MAC layer L2 header of the arrived packet sequence P1. Depending on the detected network conditions, the BS 110A may decide to ask the UE 110 for re-transmission in cases when information in the packet sequence P1 is missing. In such cases, the BS 110A may buffer the arrived parts of the packet sequence P1. The BS 120A sends the arrived parts of the packet sequence P1 to the EPC 130 via the S30 network link.

The EPC 130 may not receive the packet units P1A, P1B, P1C, P1D, and P1E in chronological order. EPC 130 examines the control plane of the arrived packet sequence P1. The EPC 130 check for the destination IP-address at the MAC layer L2 header of the arrived parts of the packet sequence P1. Depending on the detected network conditions, the EPC 130 may decide to queue and/or buffer the arrived segmented data units P1 and ask for re-transmissions. The EPC 130 sends the arrived parts of the packet sequence P1 to the destination Server 140 via the S40 network link.

The Server 140 has open network interface and receives the incoming packet sequence P1. It is noted that the incoming packet units P1A, P1B, P1C, P1D, and P1E are timestamped as they arrive at the Server 140. The incoming packet sequence P1 may not arrive in chronological order. The Server 140 examines the Layers L1 to L2 of the incoming data packets if their destination IP-addresses match the Server's 140 IP-address. If so, the Server 140 continues to examine Layers L3 to L7 and re-constructs the initial data packet P1 into data packet P2. It is noted that the Server 140 may ask the UE 110 for re-transmission in cases when information in the packet sequence P1 is missing.

Figure 7:
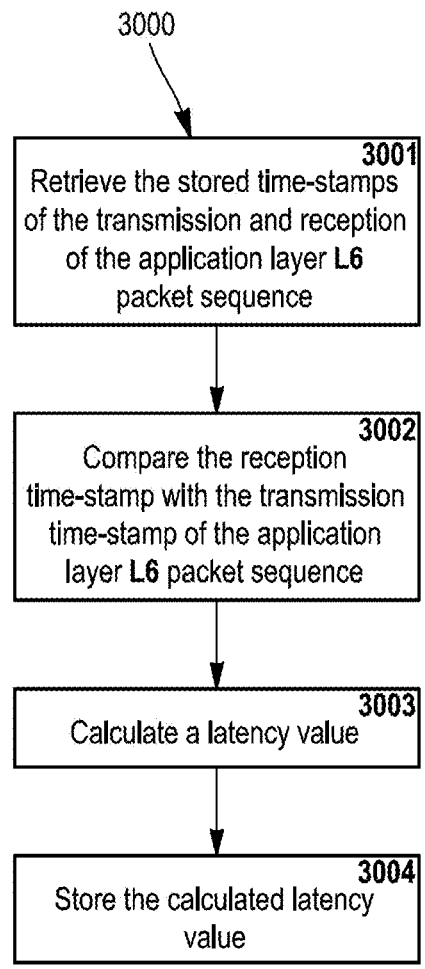
FIG. 7 is an flow chart representing the processes that a software program may go through in estimating a latency value.

FIG. 7 represents a flow chart of a software program (3000) and its procedure of estimating latency values in a wireless communication system. It is noted that the software program may be deployed on any computing node, physical or virtual, with network interface, Latency may be defined as the time it takes for each of the packet units P1A, P1B, P1C, P1D, and P1E to reach the Server 140 from UE 110A, as shown in the FIG. 6. The packet sequence P2 is the received data at the Server 140, corresponding to the packet sequence P1 sent from the UE 110A. The UE 110A may have the possibility to time-stamp each of the packet units P1A, P1B, P1C, P1D, and P1E, as they are sent on the radio. The recorded timestamps at the UE 110A and the received timestamps at the Server 140 are compared (3001 and 3002), and thus a latency value may be calculated with the following equation (3003):

$$\text{latency}_{i,j} = \text{timestamp}_j - \text{timestamp}_i \quad (1)$$

Where $i \in \forall$(P1A, P1B, P1C, P1D, P1E), and $j \in \forall$(P2A, P2B, P2C, P2D, P2E). Calculating a latency value may also be defined as the time it takes for the complete packet sequence P1 to reach the Server 140 from UE 110A. The recorded timestamp of the first sent packet unit P1A at the UE 110A may be compared to the timestamp of the last received packet unit P2E at the Server 140 (3001 and 3002). Such latency calculation may be performed with the following equation (3003):

$$\text{latency}_{i,j} = \text{timestamp}_j - \text{timestamp}_i \quad (2)$$

Where $i \in$(P1A), and $j \in$(P2E).

The latency$_{i,j}$ calculation in (1) and (2) may vary depending on the size of the complete data sequence P1 and the packet units P1A, P1B, P1C, P1D, and P1E.

The latency$_{i,j}$ calculated in (1) and (2) may also vary depending on the selected headers from the Layers L6 to L1 at the UE 110A. The latency$_{i,j}$ estimated in (1) and (2) may vary depending on the selected headers from the Layers L1 to L2 at the BS 120A and/or EPC 130.

The latency$_{i,j}$ estimated in (1) and (2) may vary depending on the network and radio condition exhibited by the packet sequence P1 along the way of reaching the Server 140. The latency$_{i,j}$ estimated in (1) and (2) may be increased in cases when the UE 110A suffers poor radio conditions, e.g. poor signal strength indicator, increased noise levels, and/or poor received signal power and quality from the serving cell. The latency$_{i,j}$ estimated in (1) and (2) may be increased as a result of broken S10 network link and/or collision on the S10 network link. The latency$_{i,j}$ estimated in (1) and (2) may be increased as a result of degraded radio environment on the S10 network link, resulting with increased re-transmissions (referred as HARQ in LTE [1]). The latency$_{i,j}$ estimated in (1) and (2) may be increased as a result of heavy load, and/or congestions at the BS 120A. The latency$_{i,j}$ estimated in (1) and (2) may be increased as a result of broken S20 network link and/or collision on the S20 network link. The latency$_{i,j}$ estimated in (1) and (2) may be increased as a result of increased re-transmissions (referred as HARQ in LTE [1]). The latency$_{i,j}$ estimated in (1) and (2) may be increased as a result of heavy load, and/or congestions at the EPC 130. The latency$_{i,j}$ estimated in (1) and (2) may be increased as a result of broken S30 network link and/or collision on the S30 network link. Finally, the latency$_{i,j}$ estimated in (1) and (2) may be increased as a result of increased re-transmissions (HARQ and RLC in LTE [1, 2]), heavy load, and/or congestions at the Server 140.

Learning and Evaluation Data

This section describes the opportunities to produce metrics which may be used as an input features in the latency model estimator. The input metrics may be used for learning of the estimation model, as well as for evaluating its estimation accuracy.

Creating Learning and Verification Data

Figure 8:
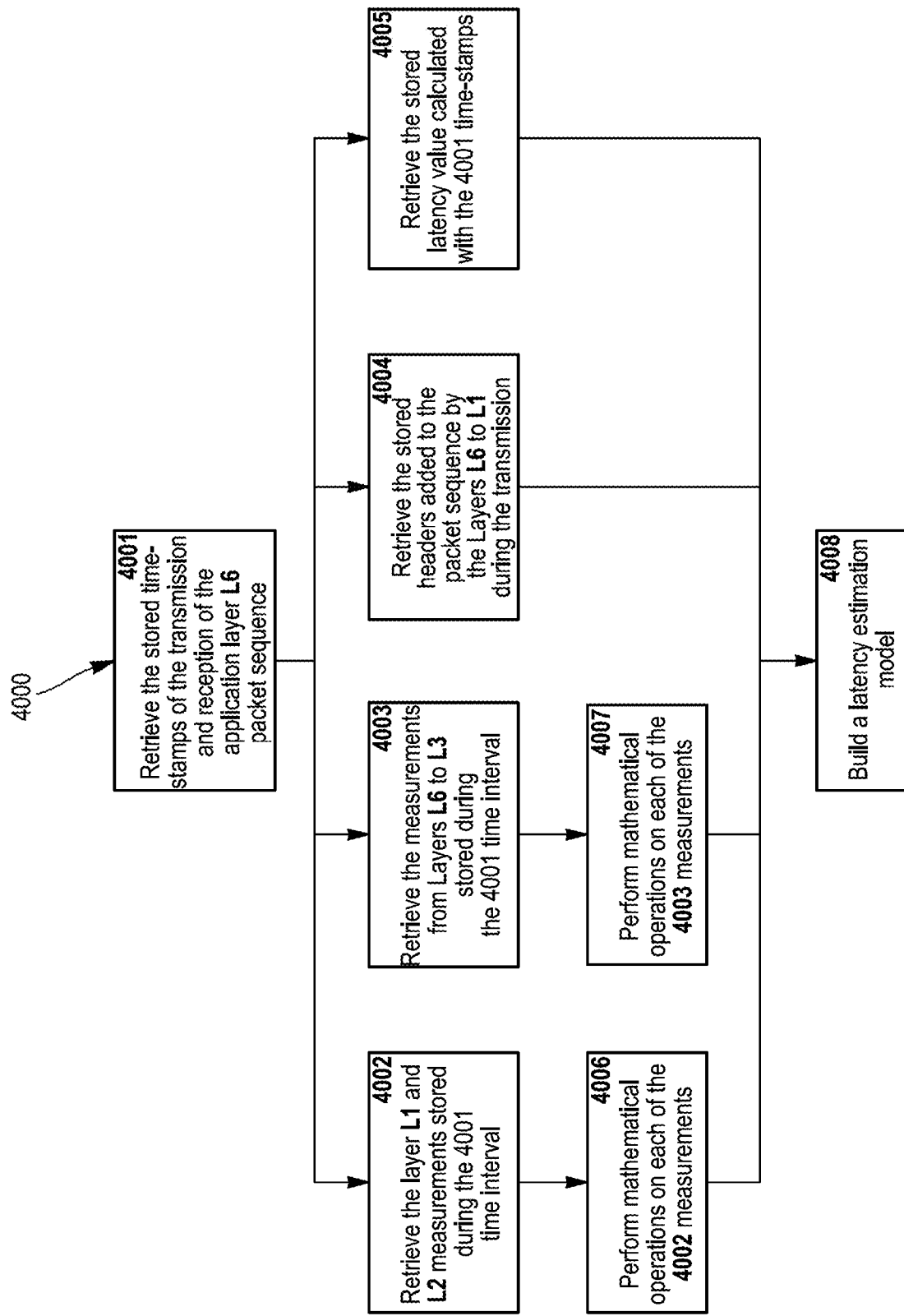
FIG. 8 is a flow chart representing the processes that a software program may go through in creating the latency estimation model.

FIG. 8 represents a flow chart of a software program (4000) and its procedure of creating the latency estimation model. For this purpose the software program, and/or method may be programmed and/or configured to retrieve the stored time-stamps of the transmission and reception of an end-to-end packet sequence transmission (4001).

The software program may retrieve the stored measured metrics from the Layers L6 to L1, which were captured during the start and end of the transmission period at the source (4002 and 4003). It is noted that Layer L1 and L2 metrics (4002) may be recorded with non-intrusive measurements, either at the UE 110 and/or BS 120. The Layer L6 to L3 (4003), together with Layer L1 and L2, metrics may be recorded with intrusive measurements at the UE 110 and/or Server 140.

It is noted that the software program may perform mathematical operations (4006 and 4007) on the retrieved 4002 and 4003 metrics. For example, in cases when there is more than one measurement for each of the metrics from Layers L6 to L1 captured during the start and end of the transmission period at the source.

The software program may retrieve the stored headers 4004 added by the layers of the protocol stack (L6 to L1) to the initial generated user traffic packet sequence. The software program may also retrieve the latency values 4005, associated with the transmission and reception (4001) of the retrieved end-to-end packet sequence transmission. Finally, all of the mentioned metrics (4002 to 4007) are used to build the latency estimation model (4008).

Figure 9:
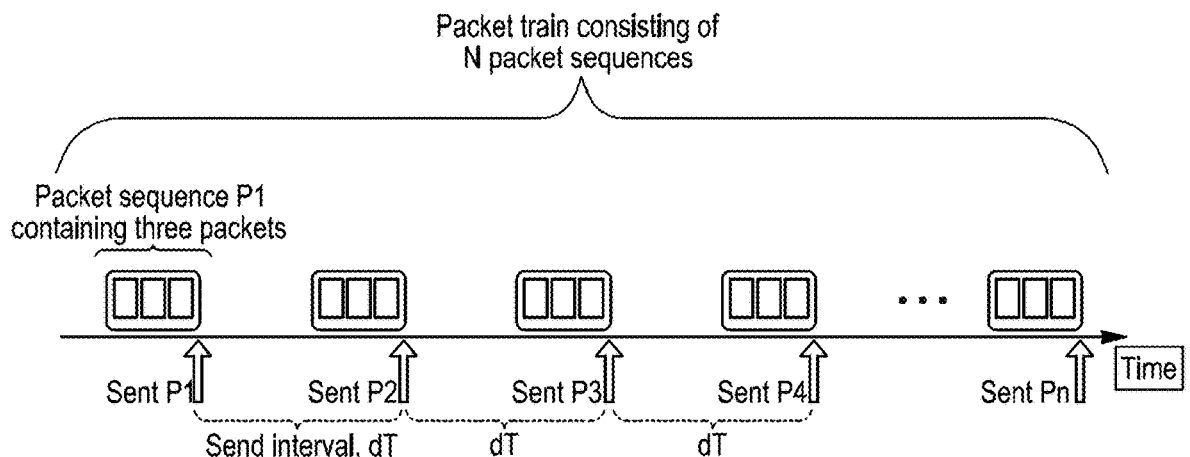
FIG. 9 is a test setup representing the differences between a packet sequence and packet train.

FIG. 9 illustrates the test setup with may create the learning and verification data-sets. The software program may send a packet train during a dT periodic transmission interval. Herein, the software program may calculate different latency values for each of the packet sequences, as a result of the radio conditions. Correspondingly, the software tool may measure different values for the metrics from Layer L6 to L1, which may be used to describe the calculated latency values. Therefore, the retrieval of the 4002, 4003, 4004, 4005, 4006 and 4007 stored metrics essentially creates a learning base on which the estimation model 4008 is created, as shown on the FIG. 8. The estimation model may be trained and statistically verified with the 4002, 4003, 4004, 4005, 4006 and 4007 stored metrics. Herein, the latency metric 4005 from the FIG. 8 may be modeled against the 4002, 4003, 4004, 4006 and 4007 stored metrics.

For the purpose of the invention, the software program may be deployed on a UE with capabilities to perform measurement of Layer L6 to L1 metrics, while sending the packet train to as server.

Radio Environment

When creating the learning and verification data sets it is important to test different radio environment, for covering all situations which will later be seen by the estimator when it is deployed. Drive tests in urban, suburban and rural areas may be utilized, depending on the area where the estimator will be deployed. Usually it is difficult to get enough values at the worst radio conditions with drive testing, so it is recommended to complement drive tests with lab equipment where the signal is dampened or an interference is added. An alternative to drive testing and live measurements is using radio simulations.

Time Synchronization

The stage of creating learning and verification data sets via sending a packet train requires perfect time synchronization among the source and destination node (e.g. UE 110 and Server 140). An accuracy problem arises when calculating the latency of an end-to-end data transmission in cases the source and destination does not share the same system clock.

Time synchronization among nodes communicating through network infrastructure is a complex task which may be achieved in two ways:

Synchronization over the network (using various protocols and services);

Synchronization using external clock references (using signals from Global Navigation Satellite System (GNSS), atomic clocks, etc.);

Convenient approaches to synchronize two nodes utilize external references, such as GNSS signals from Global Positioning System (GPS), GLONASS, GALILEO or COMPASS. It is possible to provide accurate time synchronization typically better than 100 nanoseconds to UTC [3]. However, due to the inability to receive GNSS signals in some environments, such technique is not always suitable. Main protocols which were developed to keep nodes over the network synchronized are Network Time Protocol (NTP) and Precision Time Protocol (PTP) known as IEEE Standard 1588-2008 [4].

Figure 10:
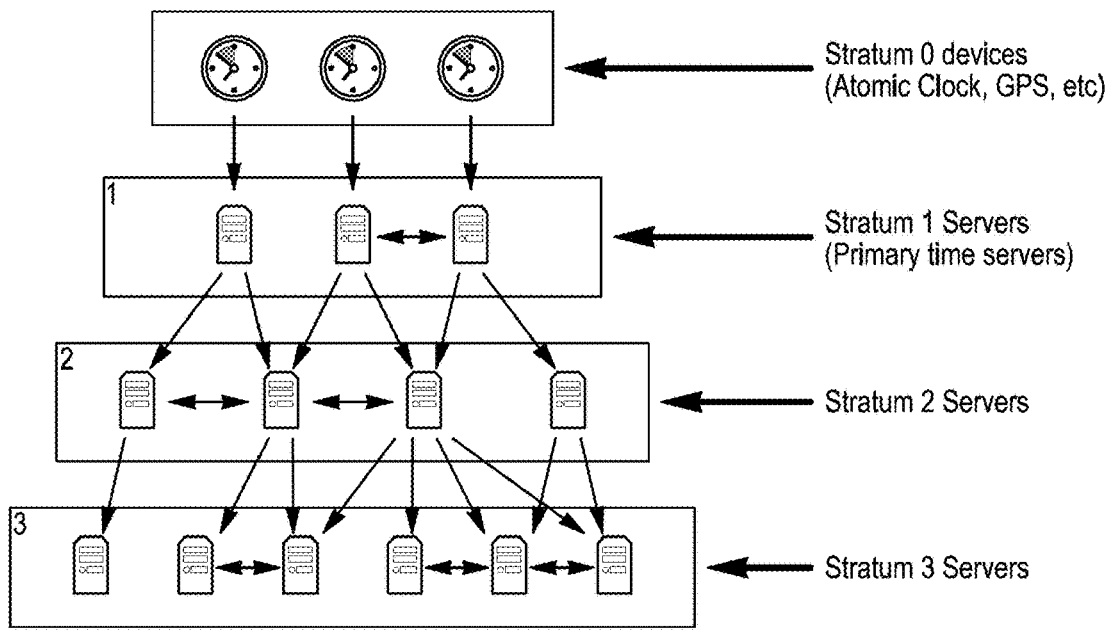
FIG. 10 is a diagram representing the NTP clock hierarchy.

FIG. 10 illustrates the NTP clock hierarchy. NTP is de-facto time-keeping standard across the Internet [5]. NTP organizes clocks in layered hierarchical way in terms of stratums. The stratum level specifies the distance between reference clock and time server which is used for synchronization. As a result, accuracy of the synchronization that can be achieved using NTP is less than 1 ms in LAN and in order of 10 ms over WAN [5]. Stratum 0 consists of high-precision atomic clocks, GPS receivers or other similar sources. Stratum 1 represents a number of time servers that are connected to stratum 0 devices. Stratum 2 servers are typically attached to several servers from stratum 1 and correct their clocks using NTP algorithm. Stratum 3+ devices are connected to several stratum 2 servers and with each other. NTP algorithm is based on estimation round-trip time (RTT) between two nodes by sending 64-bits timestamps using UDP as a Transport layer protocol. The 64-bits timestamp is composed of two parts: 32 bits for seconds and 32 bits for fractional seconds. Compensation of the offset on the client's side is performed by measuring RTT to NTP server. The crucial assumption that NTP makes at this step is that the link is symmetrical and in ideal case uplink and downlink delays are equal.

Another example of clock synchronization protocols is Precision Time Protocol (PTP), which was initially developed by IEEE to provide more accurate synchronization compared to NTP. Better accuracy is achieved by using PTP aware switches, also known as PTP Transparent Switches or Boundary Clocks. PTP takes into account switching and queueing delays by using PTP aware switches and routers. Master-Slave topology is utilized in PTP. However, PTP makes the same crucial assumption as NTP that link is symmetrical, and that switches and routers have PTP enabled which is not usually the case.

Figure 11:
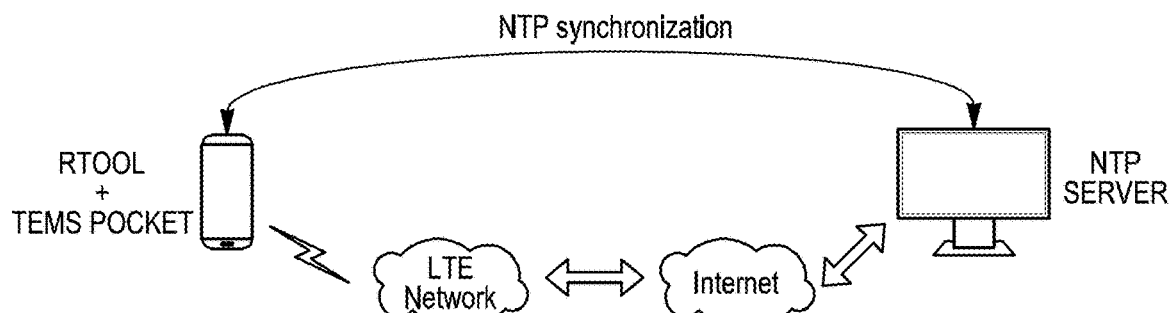
FIG. 11 is a diagram representing the possible modification on the conventional NTP topology.

FIG. 11 shows the modification of the conventional NTP topology for the purpose of the invention. NTP as a system allows modifications on its structure, with possibilities to deploy NTP on a local server, avoiding the publicly available NTP servers. In conventional NTP topology, time synchronization among nodes through public NTP servers is prone to errors due to the network fluctuations and clock offsets on the NTP servers. The absolute synchronization to UTC time through public NTP servers is not needed for the purpose of the invention, as the UE 110 and the Server 140 are directly communicating with each other. Thus, the internal clock of the Server 140 in this case may be used as a reference time, to which the UE 110 may attempt to synchronize. Deploying NTP on the Server 140 is ideal choice for mitigating the error distribution on only one side (UE 110), as the time synchronization error at the Server 140 is 0. To ensure accurate NTP synchronization on a wireless link (S10 on FIG. 1), the time synchronization must be performed under excellent/good radio conditions, as discussed by [6], shown on the Table I.

TABLE I

| | LTE signal quality | | |
|---|---|---|---|
| Signal Quality | RSRP, dBm | RSRQ, dB | CQI |
| Excellent | >−90 | >−9 | >10 |
| Good | −90 . . . −105 | −9 . . . −12 | 9 . . . 7 |
| Fair | −106 . . . −120 | <−13 | 6 . . . 1 |
| Poor | <−120 | | 0 |

Figure 12:
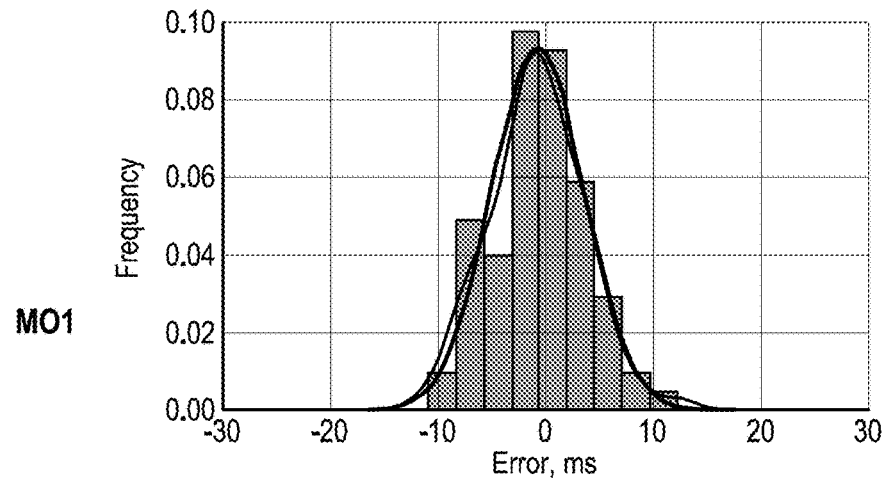
FIG. 12 is a diagram of the accumulated results from the time synchronization accuracy experiments.

FIG. 12 illustrate the results from time synchronization accuracy experiments performed for the purpose of the invention. As noted earlier, the NTP server is installed locally on the Server 140, while a UE 110 attempts to synchronize its hardware clock to the Server 140's clock through the network. The time synchronization error was measured on the live network of two mobile operators (MO1 and MO2) by connecting the UE 110 directly to the Server 140 by using Android Debug Bridge (adb). The recorded standard deviation for the MO1 was 3.73678 ms, while for MO2 it was 2.665749 ms. The recorded error distribution of 10 ms may be tolerable in cases of LTE or other previous 3GPP generations. However, the error distribution of 10 ms may not be tolerable in use-cases of the fifth generation of cellular network, as the requirements are defined as Ultra-Reliable and Low Latency Communications (URLLC), with minimal end-to-end latency and failure rate [7].

Experimental Setup

Figure 13:
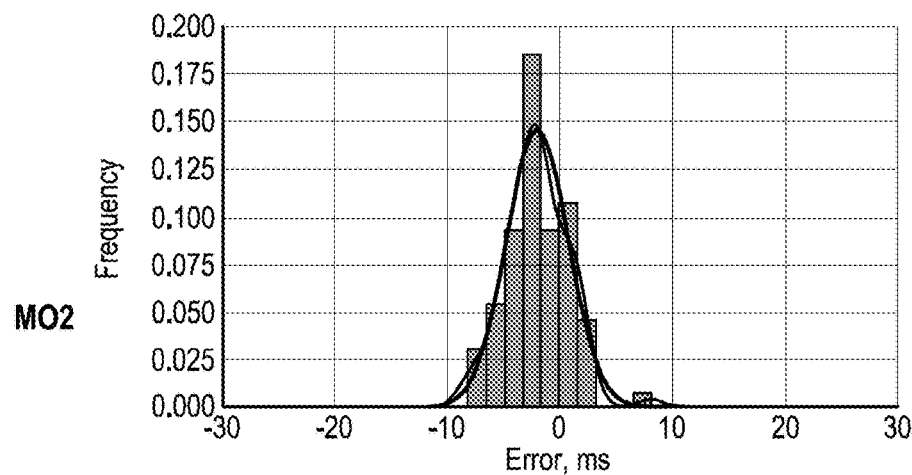
FIG. 13 is an architectural design of a software program which may be used to perform experiments for building a learning data sets.
Figure 13:
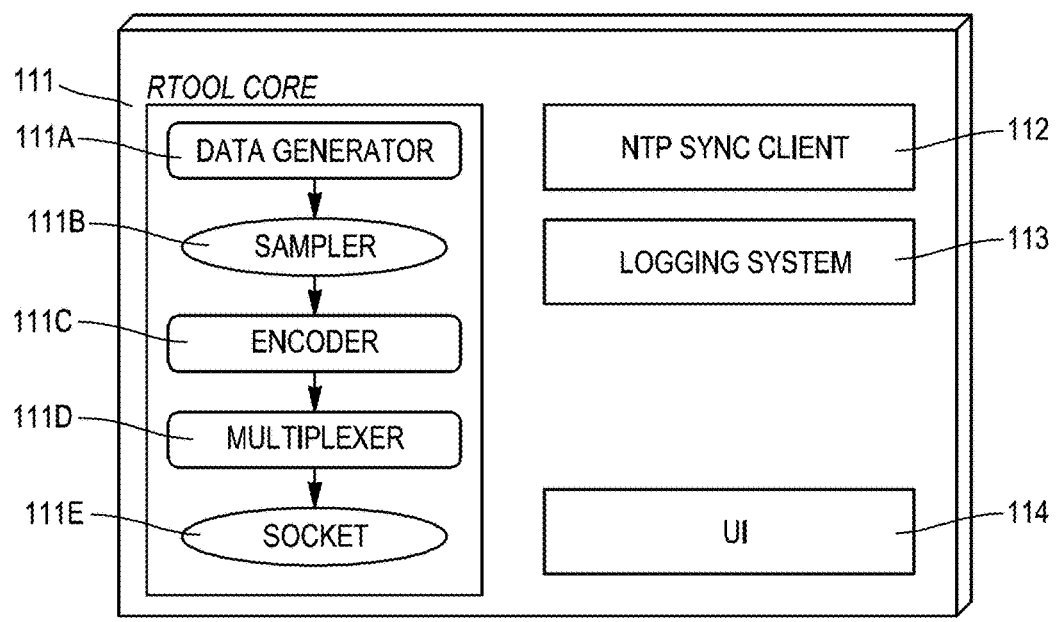

FIG. 13 shows architectural design of a software program which may be used to perform intrusive experiments intended for building the learning and verification data sets, for the purpose of the invention. The software program may be deployed on any computing node, physical or virtual, with network interface. The software program may be intentionally used to periodically send packet train to a Server, from where the latency may be calculated. The software tool may consist of the following components: Core 111, Adaptive NTP client 112, logging system for post-processing 113, and simple User Interface (UI) 114.

The Core 111 may consist of protocol stack explained with the FIGS. 2 and 3. The Core 111 may be responsible for producing Application layer L6 data, labeled as Data Generator 111A. The Core 111 may include a Sampler 111B, which specifies the sampling period, i.e. how often the software program is going to send a packet sequence to the Server. The Encored 111C may encrypt the Application layer L6 data and perform various formatting operations based on the application requirements. The Multiplexer 111D may be used to combine Application layer L6 data from several application sources running on the same UE 110, forming the packet sequence. Finally, the Core 111 may consist of a Socket 111E, which opens up a connection with the destination node and sends the packet sequences. Each layer of the protocol stack in this case adds the necessary headers to the outcome of the Multiplexer 111D. The Socket 111E may also be responsible for setting up a connection to the Server, using specified communication protocol, as explained with the FIG. 3.

The Adaptive NTP client 112 may be implemented and used on the software program for time synchronization with the Server. In this experimental setup the NTP client 112 may use the RFC5905 standard [8] to synchronize the software tool with the Server.

Latency Estimation Method

Figure 14:
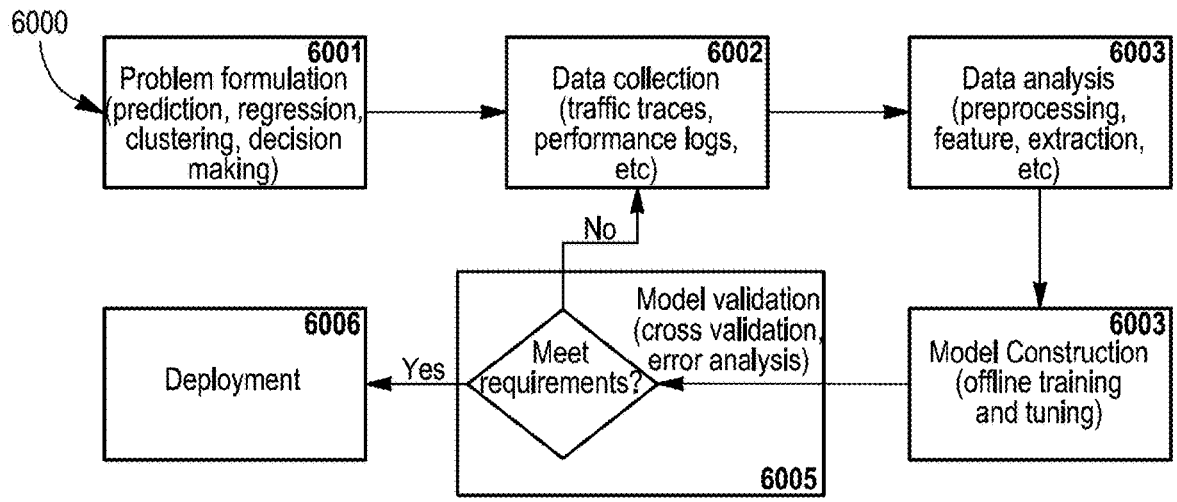
FIG. 14 is a flow chart representing the methods that a software program may go through for effectively build the latency estimation model.

FIG. 14 represents a flowchart of a software program 6000 comprising multivariate non-linear functions, linear functions, or a machine learning process in building a model for latency estimation. The estimation algorithm may use several types of mathematical and/or logical functions. In recent years, machine learning (ML) models were successfully used in various applications from bioinformatics to speech and image recognition [9]. ML tries to construct data-driven models that can capture complex and sometimes hidden dependencies. The recent developments of hardware (e.g., computational devices like GPU and TPU) and software (ML libraries like Tensorflow and Scikit-Learn) and distributed data processing frameworks (e.g., Hadoop and Spark) enable opportunities to unleash true power of machine learning for solving complex problems in networking domain. Authors of [10] provide a general flow chart 6000 which may be used to build ML model for estimating latency values. The flow chart 6000 is also useful if the estimation is performed with other mathematical tools except ML. The flowchart 6000 consists of several steps, including: Problem Formulation 6001, Data Collection 6002, Data Analysis 6003, Model Construction 6004, Model Validation 6005, and Deployment and inference 6006.

Figure 15:
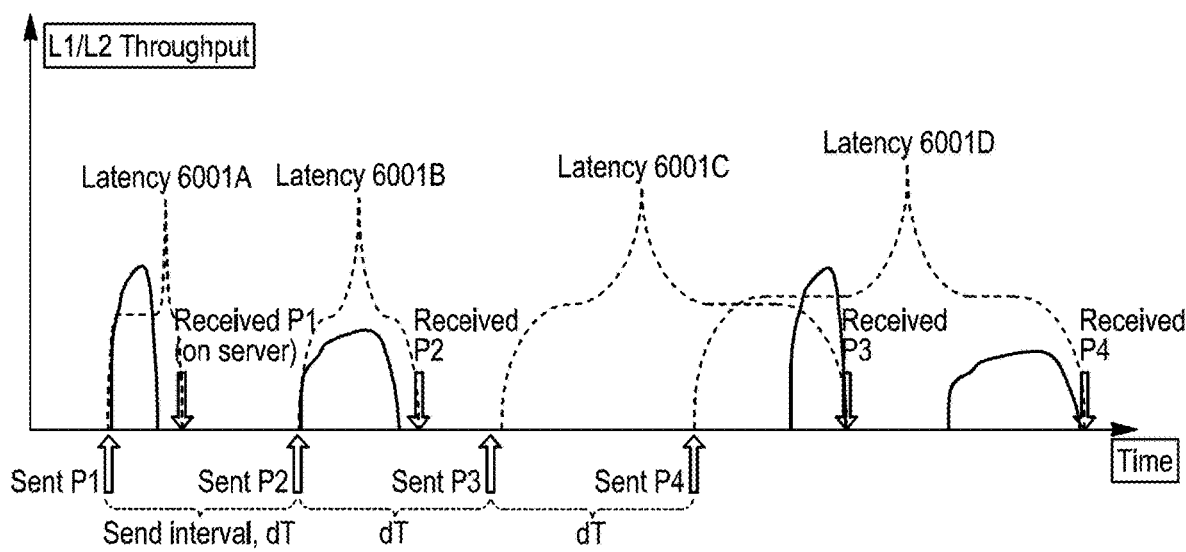
FIG. 15 is a diagram which describes the process of forming the problem in creating the latency estimation model.

FIG. 15 illustrates the first step of the flowchart 6000, part of the FIG. 14—the Problem formulation 6001. Herein, the goal is to estimate the latency caused by the radio environment and RAN in cellular network. It is noted that the cellular network is not precluded to LTE, but rather applicable to other 3GPP standards such as GSM, 3G, and 5G. The radio environment and RAN may influence the latency measurements in several ways, noted as latency values 6001A, 6001B, 6001C, and 6001D. The software program residing in the UE is configured to periodically send application layer packet sequence P1, P2, P3, and P4 at dT interval. It is noted that the interval may not be strictly periodic, but also randomly generated intervals are applicable. The present invention examines, but it is not limited to four latency cases:

- The packet sequence P1 in case 6001A experiences perfect radio quality. This means the data sequence P1 is sent at optimal speed, without retransmissions, which is reflected by a sharp throughput peak.
- The packet sequence P2 in case 6001B experiences intermediate radio quality. The data sequence P2 is sent at below optimal speed, with some retransmissions, which is reflected by a broader and lower throughput curve. The throughput decrease will be the reason for the major part of the latency increase.
- The packet sequence P3 in 6001C experiences a long period of radio interruption followed by perfect radio quality. The packet sequence P3 will be delayed during the radio interruption and sent at optimal speed when the interruption ends. The time the radio is interrupted will be the reason for the latency increase.
- The packet sequence P4 in case 6001D experiences a long period of radio interruption followed by intermediate radio quality. The data sequence P4 will be delayed during the radio interruption and sent below optimal speed when the interruption ends. The time the radio is interrupted will be the major reason for the latency increase together with the throughput decrease.

Figure 16:
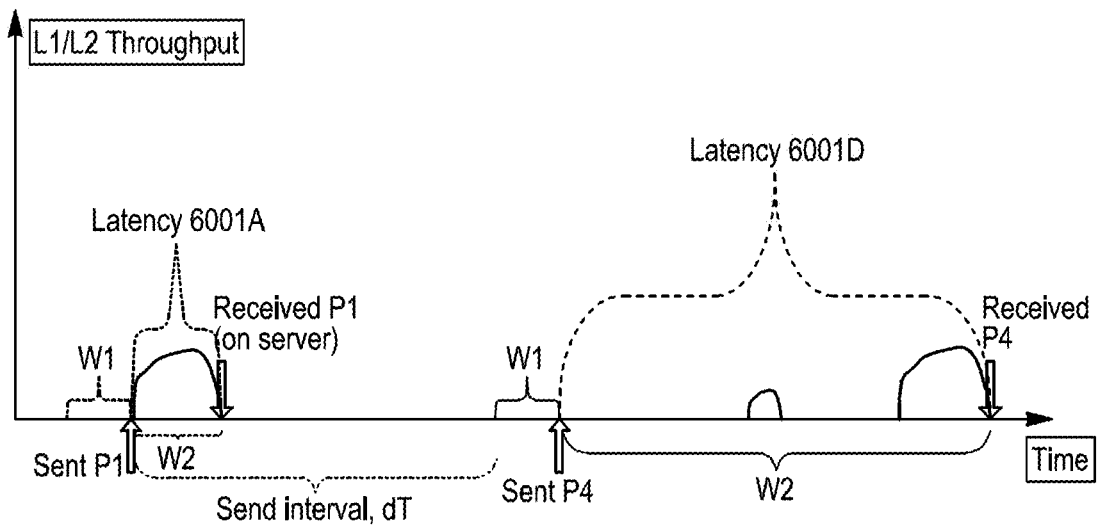
FIG. 16 is a diagram which describes the process of data collection in creating the learning and verification data sets.

FIG. 16 shows the Data Collection 6002 process for creating the learning and verification data as described with the FIG. 8 and the Section 3.1. In order to collect abundance of learning and verification data, the software tool may be programmed and/or configured to send periodically spaced application layer packet train (see FIG. 9). The idea is to periodically send packet train during drive tests and/or with lab equipment where the signal is dampened and/or interference is added. Hence, the learning and verification data set consists of latency measurements for each end-to-end transmission of a packet sequence, with captured metrics from Layer L6 to L1 during the packet train interval. An example set of measured metrics which may be considered in the learning and verification data-sets are listed, but not precluded to, in the Table II.

TABLE II

Considered metrics for the learning and verification data-sets

| | Description |
|---|---|
| Feature (LTB) | |
| MAC UL Throughput (kbit/s) | MAC layer uplink throughput |
| PDSCH Phy Throughput (kbit/s) | Total throughput on the PDSCH, measured as the throughput rate from the physical layer to the MAC layer. Sum taken over all carriers in case of carrier aggregation (CA) |
| PUSCH Phy Throughput (kbit/s) | Throughput on the PUSCH |
| PDSCH SINR | Signal to interference-plus-noise ratio on the PDSCH |
| PUSCH MCS | Modulation Coding Scheme index for the uplink transport block |
| Serving Cell RS CINR (dB) | SINR for Reference Signal of each serving cell |
| Serving Cell RSRP (dBm) | Reference Signal Received Power for each serving cell |
| Serving Cell RSRQ (dB) | Reference Signal Received Quality |
| Serving Cell RSSI (dBm) | Received Signal Strength Indicator |
| SRS TX Power | Transmit power of sounding reference signal [11] |
| SSS Detected Cell Power | Secondary Synchronization Signal power for cells detected, expressed as a value in decibel |
| Serving Cell Total RS Power (dBm) | Total Reference Signal power for serving cell, calculated from serving cell RSRP and channel bandwidth. |
| CQI Code word 0 Average | Channel Quality Indicator for code word 0 [12] |
| Cell re-selection | Mechanism to change cell after UE is camped on a cell while in IDLE mode |
| HO Info | Handover information |
| Intra-frequency Handover | Mobility in connected mode between two different cells |
| Re-transmissions | Re-transmission of data units due to errors (ex. HARQ, RLC, TCP re-transmissions) |
| BLER | Ratio of the number of erroneous blocks to the total number of blocks transmitted on a digital circuit |
| CA | Number of aggregated carriers used to send a data sequence |
| Cell configuration | Parameters capturing the BS transmit power; P_A and P_B power offsets; Cell bandwidth per link |
| Feature (5G/NR) | |
| RSSI | Received Signal Strength Indicator |
| SS-RSRP | Secondary Synchronization Reference Signal Received Power for each serving cell |
| SS-RSRQ | Secondary Synchronization Reference Signal Received Quality |
| SS-SINR | Secondary Synchronization Signal to interference-plus-noise ratio |
| SS-RSRPB | Secondary Synchronization reference signal received power per branch |
| SS Transmit Power | Power contributions (in W) of the resource elements that carry secondary synchronization signals within the secondary synchronization signal (SSS) bandwidth. |
| CSI-RSRP | Channel-State Information Reference Signal Received Power for each serving cell |
| CSI-RSRQ | Channel-State Information Reference Signal Received Quality |
| CSI-SINR | Channel-State Information Signal to interference-plus-noise ratio |
| SRS-RSRP | Sounding Reference signal received power |
| SRS-RSRQ | Sounding reference signal received quality |
| SRS-SINR | Sounding reference signal to interference-plus-noise ratio |
| DMRS-RSRP | Demodulation Reference Signal Received Power |
| DMRS-RSRQ | Demodulation Reference signal received quality |
| DMRS-SINR | Demodulation Signal to interference-plus-noise ratio |
| PTRS-RSRP | Phase tracking Reference Signal Received Power |
| PTRS-RSRQ | Phase tracking reference signal received quality |
| PTRS-SINR | Phase tracking Signal to interference-plus-noise ratio |
| BRS-RSRP | Beam Reference Signal Received Power |
| BRS-RSRQ | Beam Reference Signal Received Quality |

TABLE II-continued

Considered metrics for the learning and verification data-sets

| | Description |
|---|---|
| BRS-SINR | Beam Signal to interference-plus-noise ratio |
| UE GNSS | Timing of Cell Frames for UE positioning for E-UTRAN, code measurements, and carrier phase measurements |
| WLAN RSSI | Received Signal Strength Indicator of the surrounding wireless LAN (ex. IEEE 802.11) |
| RSTD | Reference signal time difference for E-UTRAN |
| SFN/SFTD | Timing difference between an E-UTRA PCell and an 5G/NR PSCell |
| BeamIdx | Beam index |
| Beam acquisition | Time to beam acquisition |
| CSI-IM | Channel-State Information for decoding interference measurements |
| HO Info | Handover information |
| Intra-frequency Handover | Mobility in connected mode between two different cells |
| BLER | Ratio of the number of erroneous blocks to the total number of blocks transmitted on a digital circuit |
| Physical and application layer throughput | Total throughput measured on the physical and application layer |
| CA | Number of aggregated carriers used to send a data sequence |
| Transmission Point Configuration information | Information such as: Radio Head Unit (RHU) Id; Physical Channel Id (PCI) |
| Modulation schema | Modulation Coding Scheme index for the uplink transport block |
| Frequency spacing | Frequency spacing between OFDMA carriers (e.g. 15 kHz, 30 kHz, 60 kHz, 120 kHz) |
| CQI | Channel Quality Indicator |
| RI | Rank Indicator |
| PMI | Precoding Matrix Indicator |
| BWP information | Bandwidth Part information |
| TM | Transmission mode |
| Re-transmissions Feature (UMTS) | Re-transmission of data units due to errors |
| Cell re-selection | Mechanism to change cell after UE is camped on a cell while in IDLE mode |
| Cell configuration | |
| Physical and application layer throughput | Total throughput measured at the physical and application layer |
| Handover | Mobility in connected mode between two different cells |
| DCA | Optimize the resource allocation by means of a channel quality criteria or traffic parameters |
| P-CCPCH RSCP | Received Signal Code Power, the received power on P-CCPCH of own or neighbor cell |
| RSCP | Received Signal Code Power |
| Timeslot ISCP | Interference Signal Code Power, the interference on the received signal in a specified timeslot |
| E-UTRA RSRP | E-UTRA Reference signal received power |
| E-UTRA RSRQ | E-UTRA Reference Signal Received Quality |
| E-UTRA SINR | E-UTRA reference signal-signal to noise and interference ratio |
| UTRA carrier RSSI | The received wide band power |
| GSM carrier RSSI | Received Signal Strength Indicator |
| SIR | Signal to Interference Ratio |
| CPICH Ec/No | The received energy per chip divided by the power density in the band |
| Transport channel BLER | Estimation of the transport channel block error rate (BLER) |
| UE transmitted power | The total UE transmitted power on all carriers in a specified timeslot |
| SFN-SFN observed time difference | SFN-SFN observed time difference is the time difference of the reception times of frames from two cells (serving and target) measured in the UE and expressed in chips. |
| UE GPS | Timing of Cell Frames for UE positioning, code phase |

The Data Analysis 6003 process on FIG. 14, also shown on the FIG. 16, includes data cleaning, data formatting, and feature engineering on the measured metrics (Table II). As described earlier, the Table II metrics are captured during the whole interval of the packet train. Thus, data cleaning and feature extraction processes are necessary in this case to remove the irrelevant information and produce features which have a better chance in describing the latency. Feature engineering is the major step of the entire process of ML model creation. Better feature utilization enables simpler models and produce improved statistical verification results.

In order to create the most relevant features from the metrics in Table II, there may be two windows that describe the radio conditions for each of the packet sequences (P1 and P4 in FIG. 16). In cases when periodical transmission is utilized, it may enable the software program to know precisely at what time there is supposed to be a transmission. Also, it is possible to capture an Application layer L6 timestamp, which will give information when a packet sequence should be transmitted. Therefore, it is possible to create windows which may capture the radio environment and RAN configuration during intervals before and after each packet sequence transmission (W1 and W2, correspondingly).

For the purpose of the invention, the window W1 may attempt to capture the radio conditions before each transmission starts. The idea is to capture trends of the radio conditions before the transmission happens. The size of window W1 may depend on the use-case. For instance, in cases when a UE is moving with high speed or the radio environment is highly variable, the window should be larger. However, the minimum length of the window W1 may be limited to 10 ms, due to the sub-frame length in a wireless communication. A minimal size of the window W1 may only require capturing the radio conditions of the last transmission.

On the FIG. 16 it may also be observed that the radio conditions may not allow data transmission a particular time period, as illustrated with the P4 packet sequence. In such cases the UE queues the P4 packet sequence and acknowledges the timestamp. For the purpose of the invention, the window W2 may attempt to capture the radio conditions after each transmission starts. The idea is to capture trends of the radio conditions for a period after the transmission is supposed to start. The size of window W2 may be dynamic, based on the radio conditions. For example, when the UE queues the P4 packet sequence, the window W2 may be extended until the transmission of the P4 packet sequence finishes. This means that the estimations of the latency at the time interval when the packet sequence P4 is sent will be estimates after the complete packet sequence P4 is transmitted by the UE. Therefore, the size of the window W2 shall be increased until the following criteria becomes true:

sum_of_throughput>sum_of_packet_sequence_size where the sum_of_throughput is the utilized physical layer throughput since the start of the scheduled transmission. The sum_of_packet_sequence_size is the size of the packet sequence that is scheduled for transmission, including headers and other data added from the Layers L6 to L1. The dynamic size of the window W2 will capture the cases a packet sequence is queued up in the UE, as shown on the FIG. 15 with P3 and P4 packet sequences. The size of the window W2 is calculated differently in intrusive and non-intrusive estimates:

In the intrusive case, the sum_of_throughput may be retrieved from the utilized Physical layer L1 throughput measures;

In the non-intrusive case, the sum_of_throughput may be estimated from other Layer L1 and L2 metrics. This estimation may be a machine learning problem in itself, or may be calculated by using a formula for example the Shannon-Hartley theorem.

The metrics from Table II, presented as time-series data, may be used to create features for the duration of the windows W1 and W2. The features may consist, but it is not limited to:

1. Calculating lag features that represent the measured Table II metrics at prior time samples and/or during the transmission interval of each scheduled transmission.
2. Performing aggregation and/or other mathematical operations of the Table II metrics for the duration of the windows W1 and W2. Types of statistical aggregations and/or other mathematical operations may include calculating average, median, or weighted average. The weighted average may accentuate the importance of more recent or older metric values to convey the trend of the metrics in the window. Aggregation may also be realized with filters, for example by using IIR (Infinite Impulse Response) or FIR (Finite Impulse Response), to accentuate the importance of more recent or older metric values, as well as frequency components of the Table II metric values. Performing aggregation and/or other mathematical operations may also be performed in the spatial domain, since measures of the metrics are geolocated. Spatially close metric values can add information to a feature even when the measured values are not close in time or even measured by the same UE. By close in spatial domain we mean distances up to 100 meters.
3. Utilizing the raw Table II metric values in order to capture the exact trends of the radio conditions at prior time samples and/or during the transmission interval of each scheduled transmission.
4. Divide the windows W1 and W2 in smaller sub-windows in which each of the metrics from the Table II may be aggregated in different ways (as described in the bullet point 2.) to convey the trends of the radio environment.

The goal of the Model Construction 6004 step is to select appropriate ML (Machine Learning) algorithm and optimize its inherent parameters to get a reliable model with the best estimation. A variety of algorithms and techniques may be utilized for the purpose of this invention, such as Artificial Neural Networks (MLP), Decision Tree Regressor, and/or model ensembling [13]. For example, a Decision Tree Regressor may be used as a base for bagging ensembling [13]. To perform the parameter optimization for each learning algorithm, a parameter sweep may be performed. This is a searching through a manually specified subset of the parameter space. All regressors may be trained using the learning data sets and evaluated against the verification data set.

Figure 17:
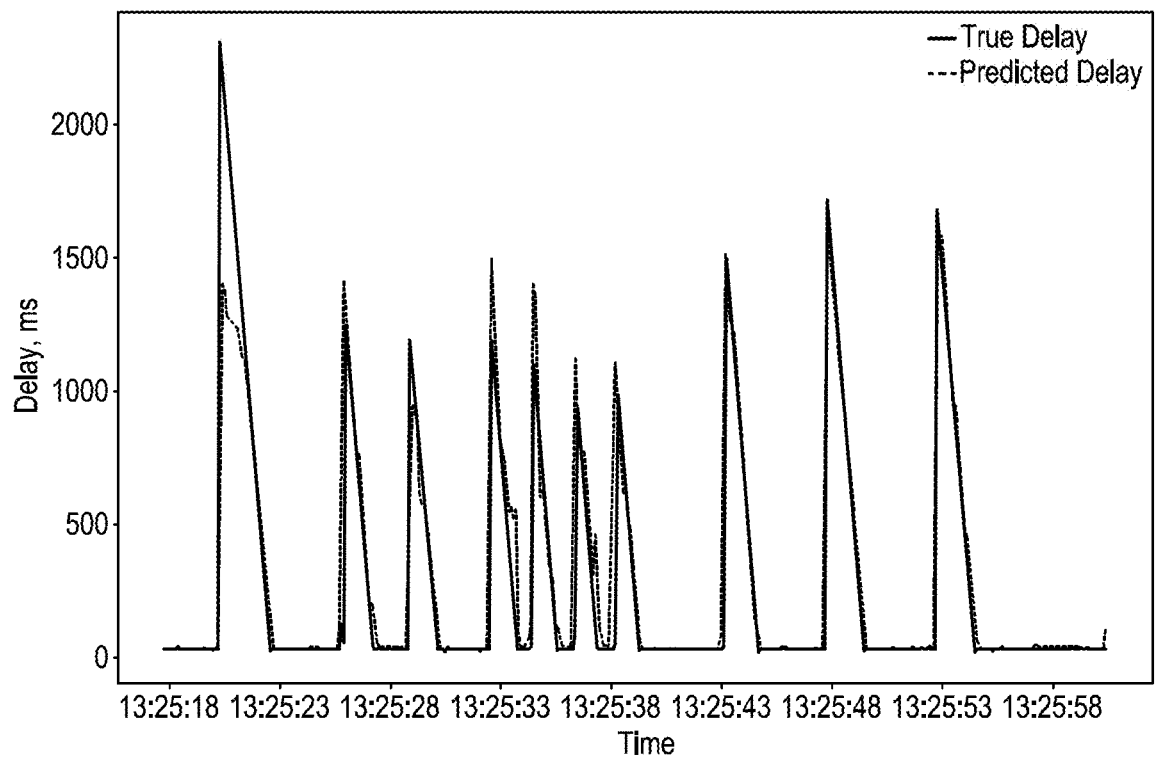
FIG. 17 is a chart representing the achieved results in the statistical validation of the latency estimation.
Figure 18:
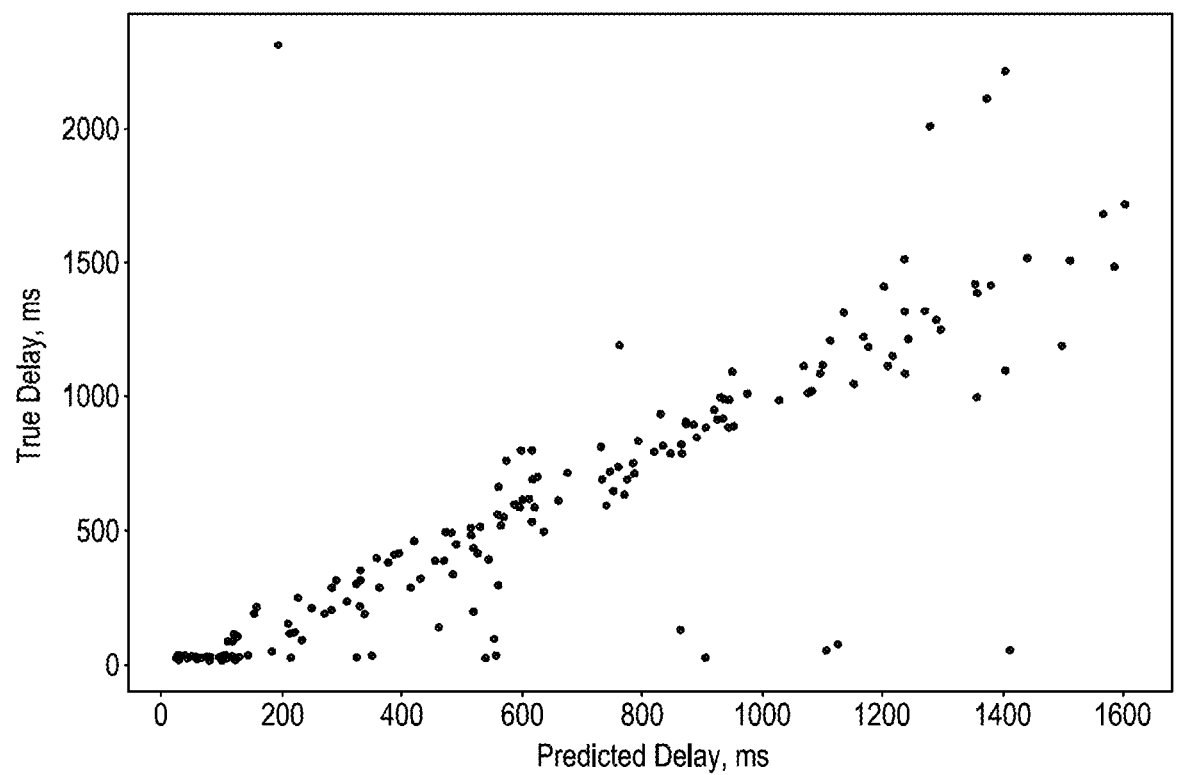
FIG. 18 is a scatter plot representing the achieved results in the statistical validation of the latency estimation.

FIG. 17 and FIG. 18 illustrate the statistical validation of the latency estimation mode. A Model Validation 6005 may be performed by evaluating the accuracy of the latency estimation using statistical measures. The learning and verification data sets which were gathered through variety of drive tests may be divided into 80/20, where 80% of the data set is used for training, and 20% for validating. The statistical verification is displayed in Table III, while FIG. 17 plots the true calculated latency versus the estimated latency as a time series. FIG. 18 plots the scatter values of the true calculated latency versus the estimated latency.

TABLE II

Estimation performance

| File size | $R^2$ (coefficient of determination) | | | Mean Absolute Error (MAE) | | |
|---|---|---|---|---|---|---|
| | NN (MLP) | Decision Tree | Bagging Decision Tree | NN (MLP) | Decision Tree | Bagging Decision Tree |
| 13 B | 73.7% | 67.3% | 81.8% | 0.29 | 0.19 | 0.13 |

Figure 19:
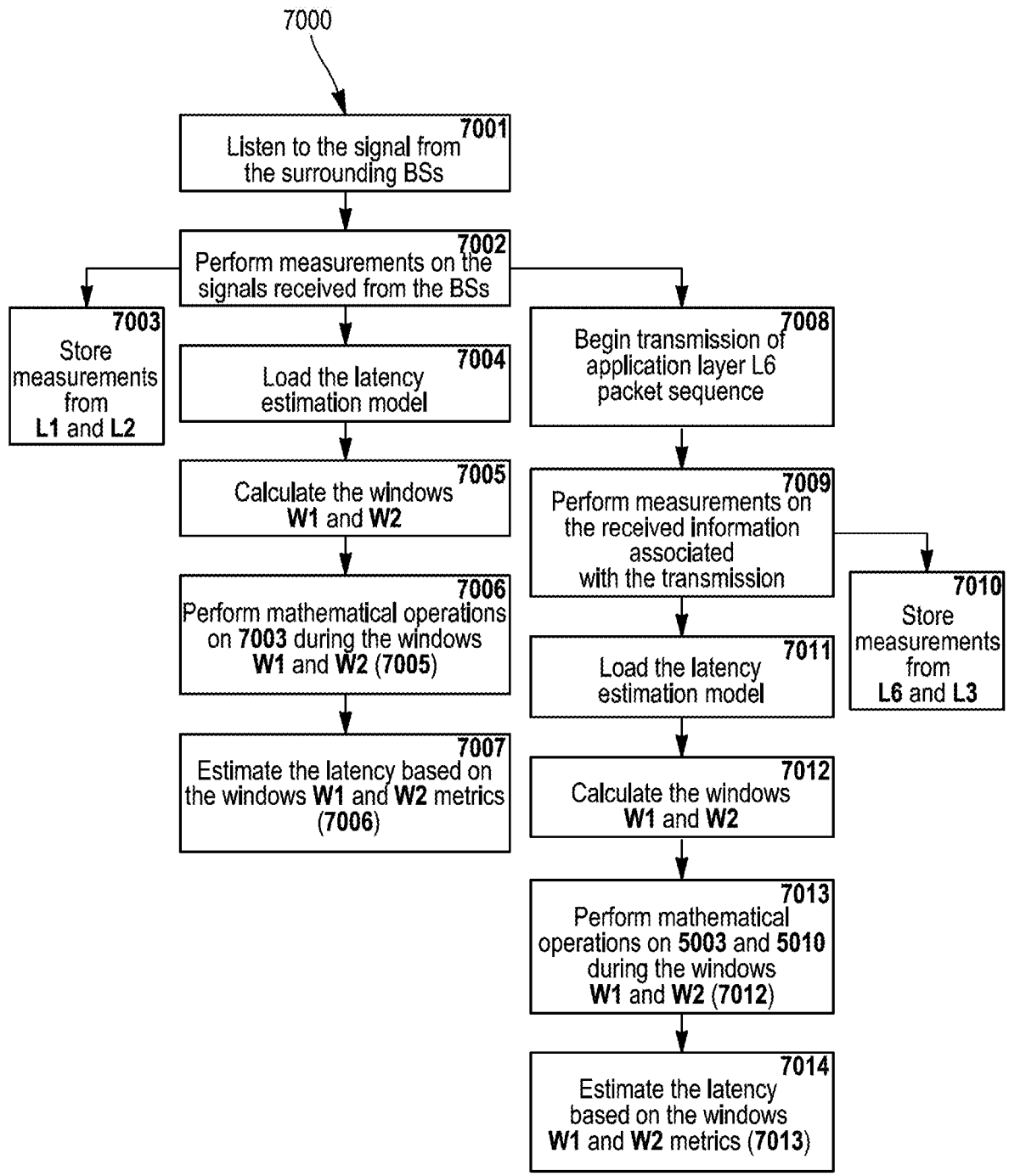
FIG. 19 is a flow chart which describes the process of deploying the latency estimation model.

FIG. 19 represents a flow chart of a software program (7000) under the Deployment 6006 (FIG. 14) process. The latency estimator may be implemented as a software program or a hardware configuration. It may be deployed in a UE, and/or BS, and/or similar node with network interface. It may also be deployed in physical or virtual server, as long as the necessary radio metrics are measured from the UE and/or BS and forwarded to the implementation instance. The Deployment 6006 (FIG. 14) process may have several scenarios for the estimator and every scenario puts its requirements on the implementation of the estimator. This invention considers, but is not precluded to three deployment scenarios:
1. Intrusive scenario where a packet sequence may be sent to improve the estimation accuracy.
2. Non-intrusive scenario where no packet sequence may be sent to improve the estimation accuracy.
3. Real time scenario, where an estimated latency value must be given within 10 ms-40 ms, satisfying the requirements for a real-time system [14];

In the first, intrusive scenario (bullet point 1.) the latency estimator may utilize a packet sequence to send to a Server (7008). It is noted that the ideal scenario is to utilize the same packet sequence which was initially used in creating the learning data sets. In this case, the latency estimation model may know the time when there is a transmission, and compute the length of the windows W1 and W2 (FIG. 16) accordingly (7012). It is noted that the software program does not have to be time-synchronized with the destination server. In fact, the software program may send the packet sequence in a void, i.e. without much knowledge of the destination server. Sending a packet sequence enables the software program to measure metrics from the Layer L6 to L1, describing the radio environment and the RAN configuration. An example of obtained metrics during a dedicated or connected mode is a handover occurrence and duration, which happens when the software program switches a serving cell.

In the second, non-intrusive scenario (bullet point 2.) the software program may not transmit any packet sequence during the estimation phase, and solely rely on the Layer L1 an L2 measurements (7003). It may be assumed that there is a "transmission" at every time-sample when the software program is configured to estimate the latency. As an example, a latency may be estimated every second and the estimation model may compute the windows W1 and W2 accordingly (7005). Hence, the latency estimation may be performed at arbitrary time intervals, which is an advantage for the non-intrusive case, as it may produce more frequent estimations compared to the intrusive scenario. However, the non-intrusive scenario may give a latency estimation with lower accuracy due to following reasons:

There will be no metrics related to the actual transmission. Metrics like throughput, BLER and re-transmissions, which all have a good descriptive power for the latency, will be missing.

The length of the window W2 may be harder to estimate as there is no recorded throughput.

There will be no dedicated mode so metrics will have lower measurement frequency.

However, in cases when the requirements on non-intrusiveness are not absolute, the accuracy may be improved by sending a small packet at an interval of a few seconds (exact value is system and vendor dependent). The small packet may be sent in order to keep the software program in a dedicated mode, which enables increased frequency of the radio measurements. Keeping the software program in a dedicated mode enables capturing handovers, which may increase the latency values.

In the third, real-time scenario (bullet point 3.) the estimator is limited to use only the features generated with the window W1 (FIG. 16) with prior values, and exclude the features generated with the window W2 (FIG. 16). The real-time requirements may limit the estimator ability to estimate latency values that are in order of a second. This is illustrated with the scatter plot on the FIG. 18, as the detected latency value reaches one second, or above, the accuracy proportionally decreases. A reason for the lower accuracy may be the real-time requirements itself, as the estimator must produce a latency value within 10 to 50 ms. The nature of a real-time may also put constraints on the utilized hardware, number and type of features, and type of utilized ML algorithm, as each of them might impact the computational speed. The real-time scenario may utilize both intrusive and/or non-intrusive latency estimations.

REFERENCES 1. 3GPP TS 36.321 version 10.1.0 Release 10
2. 3GPP TS 36.322 version 10.0.0 Release 10
3. Endace, "IEEE 1588 PTP clock synchronization over a WAN backbone," Endace Technology Limited
4. IEEE, "IEEE Standard for a Precision Clock Synchronization Protocol for Networked Measurement and Control Systems," IEEE Std 1588-2008 (Revision of IEEE Std 1588-2002), pp. 1-300, 2008
5. P. Corcoran, "A Matter of Timing: Consumer Electronics and Network Time," IEEE Consumer Electronics Magazine, osa/vuosik. 2, nro 4, pp. 20-25, 2013
6. 3GPP TS 28.627 version 13.2.0 Release 13
7. 3GPP TS 38 Series Release 15
8. Burbank, Jack, David Mills, and William Kasch. "Network time protocol version 4: Protocol and algorithms specification." Network (2010).
9. I. Goodfellow, Y. Bengio, A. Courville ja Y. Bengio, Deep learning (Vol. 1), Camridge: MIT press, 2016
10. M. Wang, Y. Cui, X. Wang, S. Xiao ja J. Jiang, "Machine Learning for Networking: Workflow, Advances and Opportunities," IEEE Network, osa/vuosik. 32, nro 2, pp. 92-99, 2018
11. 3GPP TS 36.213 version 8.2.0, Release 13
12. 3GPP TS 36. 21 1 version 13. 2.0, Release 8
13. D. S. Clifton, "Classification and Regression Trees, Bagging, and Boosting," Handbook of Statistics, osa/vuosik. 24, pp. 303-329, 2005
14. Kopetz, Hermann. *Real-time systems: design principles for distributed embedded applications*. Springer Science & Business Media, 2011.

We claim:
1. A method for estimating latency in a packet based wireless network for communication between two network nodes, wherein the method comprises:
   a. measuring at least one of the following metrics while in idle mode from a serving cell and/or non-serving cell and/or beams:
      i. total received power at a user equipment,
      ii. pilot signals power,
      iii. reference signals power,
      iv. interference power,
      v. noise power,
      vi. signal to noise ratio,
      vii. signal to interference-plus-noise ratio,
      viii. number of re-transmissions,
      ix. cell re-selection,
      x. cell configuration;
   b. estimating latency by using multivariable, non-linear or linear function prediction, machine learning based prediction or mathematical or logical predictions based on the at least one metric,
   c. wherein the at least one measured metric is filtered and/or, when several metrics are measured, aggregated during a measurement window to create new higher level at least one metric resulting in improved latency estimation accuracy, where the measurement window comprises either one or several combinations of:
      a. measurements from prior time,
      b. measurements during the transmission interval,
      c. measurements within a spatial area.

2. The method according to claim 1, wherein the wireless network is an UMTS network, wherein the method further comprises:
   a. using at least one of the following metrics while in dedicated mode:
      i. Cell re-selection,
      ii. Cell configuration,
      iii. Physical throughput,
      iv. Handover,
      v. Dynamic Channel Assignment (DCA),
      vi. Timeslot Interference Signal Code Power (ISCP),
      vii. Received Signal Code Power (RSCP) from one or more detectable cells,
      viii. Common Pilot Channel (CPICH) Ec/No from one or more detectable cells,
      ix. Evolved Universal Terrestrial Radio Access (E-UTRA) Reference signal Receive Power (RSRP) from one or more detectable cells,
      x. Evolved Universal Terrestrial Radio Access (E-UTRA) Reference Signal Receive Quality (RSRQ) from one or more detectable cells,
      xi. Evolved Universal Terrestrial Radio Access (E-UTRA) Signal-to-interference-plus-noise ratio (SINR),
      xii Universal Terrestrial Radio Access (UTRA) carrier Received Strength Indicator (RSSI) from one or more detectable cells,
      xiii. Global System for Mobile Communication (GSM) carrier Received Signal Strength Indicator (RSSI) from one or more detectable cells,
      xiv. Signal to interference ratio (SIR),
      xv. Transport channel Block Error Rate (BLER),
      xvi. User Equipment (UE) transmitted power,
      xvii. User Equipment (UE) Global System for Mobile Communication (GPS),
   b. or using at least one of the following metrics while in idle mode:
      i. Cell re-selection,
      ii. Cell configuration,
      iii. Timeslot Interference signal code power (ISCP),
      iv. received signal code power (RSCP) from one or more detectable cells,
      v. Evolved Universal Terrestrial Radio Access (E-UTRA) Reference Signal Receive Power (RSRP) from one or more detectable cells,
      vi. Evolved Universal Terrestrial Radio Access (E-UTRA) Reference Signal Receive Quality (RSRQ) from one or more detectable cells,
      vii. Evolved Universal Terrestrial Radio Access (E-UTRA) Signal-to-interference-plus-noise ratio (SINR),
      viii. Universal Terrestrial Radio Access (UTRA) carrier Received Signal Strength Indicator (RSSI) from one or more detectable cells,
      ix. Global System for Mobile Communication (GSM) carrier received Signal Strength Indicator (RSSI) from one or more detectable cells,
      x. Signal to interference ratio (SIR),
      xi. Transport channel Block Error Rate (BLER),
      xii. User Equipment (UE) transmitted power,
      xiii. User Equipment (UE) Global System for Mobile Communication (GPS).

3. The method according to claim 1, wherein the wireless network is an LTE network, wherein the method further comprises:
   a) using at least one of the following metrics while in dedicated mode
      i. Received Signal Strength Indicator (RSSI),
      ii. Received Power, received quality, carrier to interference plus noise ratio, signal to interference plus noise ratio, retrieved from the:
         1. Channel State Information Reference Signal (CSI-RS),
         2. Multicast Broadcast Single Frequency Network Reference Signal (MBSFN-RS),
         3. Cell Specific Reference Signal (CRS),
         4. User Equipment Reference Signal (UERS),
         5. Positioning Reference Signal (PRS),
         6. Demodulation Reference Signal (DMRS),
         7. Secondary Synchronization Signal (SSS),
         8. Sounding Reference Signal (SRS),
      iii. Physical Downlink Shared Channel (PDSCH) Physical Throughput,
      iv. Physical Uplink Shared Channel (PUSCH) Physical Throughput,
      v. Transmit Power per bandwidth and/or per reference signal/channel,
      vi. Channel Quality Indicator (CQI) Code,
      vii. Cell re-selection,
      viii. Handover Information,
      ix. Intra-frequency Handover,
      X. Re-transmissions,
      xi. Block Error Rate (BLER),
      xii. Carrier Aggregation, and
      xiii. Cell configuration,
   b. or using at least one of the following metrics while in idle mode:
      i. Received Signal Strength Indicator (RSSI),
      ii. Received Power, received quality, carrier to interference plus noise ratio, signal to interference plus noise ratio, retrieved from the:

1. Channel State Information Reference Signal (CSI-RS)
2. Multicast Broadcast Single Frequency Network Reference Signal (MBSFNRS)
3. Cell Specific Reference Signal (CRS)
4. User Equipment Reference Signal (UERS)
5. Positioning Reference Signal (PRS)
6. Demodulation Reference Signal (DMRS),
7. Secondary Synchronization Signal (SSS), or
8. Sounding Reference Signal (SRS), iii. Transmit Power per bandwidth and/or per reference signal/channel,
iv. Cell re-selection,
v. Carrier Aggregation,
vi. Cell configuration.

4. The method according to claim 1, wherein the wireless network is an 5G/NR network, wherein the method further comprises:
 a. using at least one of the following metrics while in dedicated mode:
  i. Received Signal Strength Indicator (RSSI) from one or more detectable cells and/or beams,
  ii. Reference Signal Received Power (RSRP), Reference Signal Received Quality (RSRQ), Signal to Interference Plus Noise Ratio (SINR)/channel quality, retrieved from the:
   1. Secondary Synchronization Signal (SSS),
   2. Channel State Information Reference Signal (CSI-RS),
   3. Sounding Reference Signal (SRS),
   4. Demodulation Reference Signal (DMRS),
   5. Phase Tracking Reference Signal (PTRS),
   6. Beam Reference Signal (BRS),
  iii. Transmit Power per bandwidth and/or per reference signal/channel,
  iv. User Equipment Global Navigation Satellite System (UE GNSS),
  v. Reference Signal Time Difference (RSTD),
  vi. Framing Time Difference (SFTD),
  vii. System Frame Number (SFN),
  viii. BeamIdx,
  ix. Beam acquisition,
  x. Handover (HO) Info,
  xi. Intra-frequency Handover,
  xii. Block Error Rate (BLER),
  xiii. Physical and application layer throughput,
  xiv. Carrier Aggregation,
  xv. Transmission Point Configuration Information (TPCI),
  xvi. Cell configuration,
  xvii. Modulation schema,
  xviii. Frequency spacing,
  xix. Channel Quality Indicator (CQI),
  xx. Rank Indicator (RI),
 b. or using at least one of the following metrics while in idle mode:
  i. Received Signal Strength Indicator (RSSI) from one or more detectable cells and/or beams,
  ii. reference signal received power (RSRP), reference signal received quality (RSRQ), signal to interference plus noise ratio (SINR)/channel quality, retrieved from the:
   1. Secondary synchronization signal (SSS),
   2. Channel state information reference signal (CSI-RS),
   3. Sounding reference signal (SRS),
   4. Demodulation reference signal (DMRS),
   5. Phase tracking reference signal (PTRS),
   6. Beam reference signal (BRS),
  iii. user equipment Global navigation satellite system (UE GNSS),
  iv. reference signal time difference (RSTD),
  v. Framing time difference (SFTD),
  vi. system frame number (SFN),
  vii. block error rate (BLER),
  viii. Cell configuration,
  ix. Frequency spacing.

5. The method according to claim 1, wherein the at least one metric is measured and/or derived from one or more of:
 a. Physical layer,
 b. Medium Access Control/Data Link (MAC/DL) layer,
 c. Radio Link Control/Radio Resource Control/Radio Resource Management (RLC/RRC/RR) layer,
 d. Packet Data Convergence Protocol (PDCP) layer,
 e. Non-Access Stratum (NAS) layer,
 f. transport layer,
 g. Application layer.

6. The method according to claim 1, wherein the method further comprises the step of measuring at least one of the following metrics while in dedicated mode using packet sequence and/or available traffic from a serving cell and/or beams:
 ii. throughput,
 iii. block error rate,
 iv. total received power at a user equipment,
 v. pilot signals power,
 vi. reference signals power,
 vii. interference power,
 viii. noise power,
 ix. signal to noise ratio,
 x. signal to interference-plus-noise ratio,
 xi. transmit power,
 xii. used modulation scheme,
 xiii. handover,
 xiv. number of re-transmissions,
 xv. cell re-selection,
 xvi. cell configuration,
 xvii. carrier aggregation,
 xviii. spatial and/or temporal multiplexing,
 xix. beam acquisition,
 xx. beam switching,
 xxi. phase tracking.

7. A system, comprising:
 a. one or more processors;
 b. one or more non-transitory storage media storing instructions which, when executed by the one or more processors, cause in a packet based wireless network for communication between two network nodes, the implementation of the method of claim 1.

8. The system according to claim 7, wherein at least one of the two network nodes is either deployed physically or virtually, and consists of a User Equipment, and/or a Base Station, and/or any node with wireless network interface.

* * * * *